US012047099B2

(12) United States Patent
Onishi

(10) Patent No.: US 12,047,099 B2
(45) Date of Patent: Jul. 23, 2024

(54) CONTROLLER, DISTORTION COMPENSATION DEVICE, COMMUNICATION DEVICE, AND METHOD OF ADJUSTING INPUT SIGNAL FOR DISTORTION COMPENSATION

(71) Applicant: SUMITOMO ELECTRIC INDUSTRIES, LTD., Osaka (JP)

(72) Inventor: Masahiko Onishi, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 206 days.

(21) Appl. No.: 17/578,229

(22) Filed: Jan. 18, 2022

(65) Prior Publication Data

US 2022/0231712 A1      Jul. 21, 2022

(30) Foreign Application Priority Data

Jan. 21, 2021   (JP) .................................. 2021-008003

(51) Int. Cl.
*H04B 1/04*      (2006.01)
*H04B 1/12*      (2006.01)
(Continued)

(52) U.S. Cl.
CPC ............... *H04B 1/04* (2013.01); *H04B 1/126* (2013.01); *H04B 1/18* (2013.01); *H04B 2001/0425* (2013.01)

(58) Field of Classification Search
CPC .......... H03F 1/3241; H04M 3/18; H04B 1/04; H04B 1/126; H04B 1/18; H04B 2001/0425; H04B 1/0475; H04B 1/10; H04B 15/00

See application file for complete search history.

(56) References Cited

U.S. PATENT DOCUMENTS 6,741,128 B2    5/2004  Okubo et al.
2009/0195309 A1*  8/2009  Yamaoka ............... H03F 1/3288
                                                   330/149
(Continued)

FOREIGN PATENT DOCUMENTS

EP    2 779 440        9/2014
JP    2002-330032      11/2002
(Continued)

OTHER PUBLICATIONS

Gumber, Karan, et al., A Modified Hybrid RF Predistorter Linearizer for Ultra Wideband 5G Systems, *IEEE Journal on Emerging and Selected Topics in Circuits and Systems*, vol. 7, No. 4, Dec. 2017, pp. 547-557.

(Continued)

*Primary Examiner* — Andrew Wendell
(74) *Attorney, Agent, or Firm* — SMITH, GAMBRELL & RUSSELL, LLP.

(57) ABSTRACT

A controller is a controller for an adjuster that adjusts an input signal for pre-distortion of an amplifier. The controller includes a determination unit that determines a target section corresponding to electric power of the input signal among set sections and a generator that generates a control signal. The adjuster is configured to adjust at least one of an amplitude and a phase of the input signal. An amount of adjustment of at least one of the amplitude and the phase of the input signal is brought in correspondence with each of the sections. The generator generates a signal indicating the amount of adjustment brought in correspondence with the target section as the control signal and provides the control signal to the adjuster.

13 Claims, 15 Drawing Sheets

(51) Int. Cl.
*H04B 1/18* (2006.01)
*H04B 15/00* (2006.01)

(56) References Cited

U.S. PATENT DOCUMENTS

| | | | |
|---|---|---|---|
| 2009/0285329 A1* | 11/2009 | Matsuoka | H03F 3/245 |
| | | | 455/127.1 |
| 2010/0027445 A1* | 2/2010 | Matsuura | H04B 1/0475 |
| | | | 370/278 |
| 2010/0291885 A1* | 11/2010 | Shimizu | H03F 1/0222 |
| | | | 455/102 |
| 2011/0032033 A1 | 2/2011 | Keerthi et al. | |
| 2011/0304390 A1* | 12/2011 | Huang | H03F 1/3241 |
| | | | 330/149 |
| 2012/0189081 A1* | 7/2012 | Omoto | H04L 27/36 |
| | | | 375/298 |
| 2014/0292405 A1* | 10/2014 | Takano | H03F 1/3247 |
| | | | 330/149 |
| 2016/0173147 A1* | 6/2016 | Ishikawa | H04B 1/0475 |
| | | | 375/296 |
| 2020/0119699 A1* | 4/2020 | Nishihara | H04B 1/04 |

FOREIGN PATENT DOCUMENTS

| | | |
|---|---|---|
| JP | 2003-078360 A | 3/2003 |
| JP | 2007-208315 A | 8/2007 |
| JP | 2008-258714 A | 10/2008 |
| JP | 2013-198063 | 9/2013 |
| JP | 2014-179987 A | 9/2014 |
| JP | 2014-528681 A | 10/2014 |
| WO | 2013-053557 | 4/2013 |

OTHER PUBLICATIONS

Japanese Office Action received relative to JP 2021-008003, mailed Apr. 19, 2024 (8 pages English, 9 pages Japanese).

* cited by examiner

CONTROLLER, DISTORTION COMPENSATION DEVICE, COMMUNICATION DEVICE, AND METHOD OF ADJUSTING INPUT SIGNAL FOR DISTORTION COMPENSATION

BACKGROUND OF THE INVENTION

Field of the Invention

The present disclosure relates to a controller, a distortion compensation device, a communication device, and a method of adjusting an input signal for distortion compensation.

Description of the Background Art

A signal amplifier causes distortion of a signal. Therefore, distortion compensation for compensating for distortion of the amplifier is required. US Patent Publication No. 2011/0032033 and Karan Gumber et al., "A Modified Hybrid RF Predistorter Linearizer for Ultra Wideband 5G Systems," IEEE JOURNAL ON EMERGING AND SELECTED TOPICS IN CIRCUITS AND SYSTEMS, Vol. 7, No. 4, December 2017, pp. 547-557 disclose pre-distortion of an amplifier.

SUMMARY OF THE INVENTION

In operating an amplifier at high efficiency, distortion (an unnecessary radiation signal) of an amplifier spreads over a band three to five times as wide as a signal bandwidth. A conventional distortion compensation device cancels a distortion signal by generating an inverse signal (inverse distortion) of a distortion component. Therefore, inverse distortion should have a band three to five times as wide as the signal bandwidth. In order to generate inverse distortion over a wide band, the conventional distortion compensation device should operate at a high speed.

In addition, since a signal bandwidth has expanded with increase in speed in wireless communication, further speedup of the distortion compensation device is required. For example, a signal bandwidth in the fourth generation mobile communication system (4G) is 20 MHz at the maximum and a signal bandwidth in the fifth generation mobile communication system (5G) is 400 MHz at the maximum.

Furthermore, in the sixth generation mobile communication system (6G), the signal bandwidth is expected to exceed 1 GHz. A distortion compensation device adapted to the sixth generation mobile communication system (6G) is required to operate at a very high speed to be capable of distortion compensation over an ultra wide band three to five times as wide as a signal bandwidth exceeding 1 GHz.

Thus, since an operation at a high speed approximately three to five times as high as the signal bandwidth is required in distortion compensation using inverse distortion, in order to adapt to the ultra wide band, an ultrahigh speed operation is required.

Therefore, a technique that allows reduction in operation speed in distortion compensation is desired.

One aspect of the present disclosure is directed to a controller for an adjuster that adjusts an input signal for pre-distortion of an amplifier. The controller in the disclosure includes a determination unit that determines a target section corresponding to electric power of the input signal from among set sections and a generator that generates a control signal. The adjuster is configured to adjust at least one of an amplitude and a phase of the input signal. An amount of adjustment of at least one of the amplitude and the phase of the input signal is brought in correspondence with each of the sections. The generator generates a signal indicating the amount of adjustment brought in correspondence with the target section as the control signal and provides the control signal to the adjuster.

Another aspect of the present disclosure is directed to a distortion compensation device. The distortion compensation device in the disclosure includes an adjuster including a first adjustment unit that adjusts at least one of an amplitude and a phase of an input signal and a controller. The controller includes a determination unit that determines a target section corresponding to electric power of the input signal from among set sections and a generator that generates a control signal. An amount of adjustment of at least one of the amplitude and the phase of the input signal is brought in correspondence with each of the sections. The generator generates a signal indicating the amount of adjustment brought in correspondence with the target section as the control signal and provides the control signal to the first adjustment unit.

Another aspect of the present disclosure is directed to a communication device. The communication device in the disclosure includes an amplifier and a distortion compensation device that compensates for distortion of the amplifier. The distortion compensation device includes an adjuster that adjusts at least one of an amplitude and a phase of an input signal and a controller. The controller includes a determination unit that determines a target section corresponding to electric power of the input signal from among set sections and a generator that generates a control signal. An amount of adjustment of at least one of the amplitude and the phase of the input signal is brought in correspondence with each of the sections. The generator generates a signal indicating the amount of adjustment brought in correspondence with the target section as the control signal and provides the control signal to the adjuster.

Another aspect of the present disclosure is directed to a method of adjusting an input signal for distortion compensation of an amplifier. The method in the disclosure includes determining a target section corresponding to electric power of the input signal from among set sections and generating a control signal for adjusting at least one of an amplitude and a phase of the input signal. An amount of adjustment of at least one of the amplitude and the phase of the input signal is brought in correspondence with each of the sections. The control signal is generated as a signal indicating the amount of adjustment brought in correspondence with the target section.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
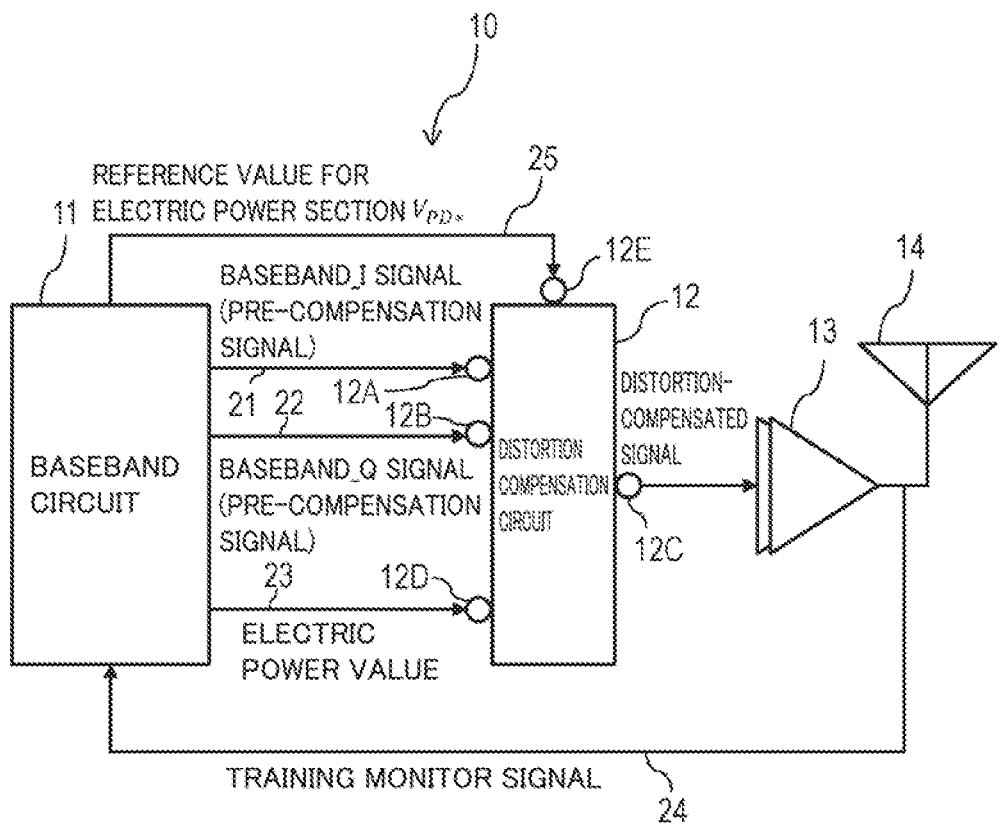
FIG. 1 is a diagram showing a configuration of a communication device.

Description of Embodiment of the Present Disclosure (1) A controller according to an embodiment is a controller for an adjuster that adjusts an input signal for predistortion of an amplifier. The controller includes a determination unit that determines a target section corresponding to electric power of the input signal from among set sections and a generator that generates a control signal. The adjuster is configured to adjust at least one of an amplitude and a phase of the input signal. An amount of adjustment of at least one of the amplitude and the phase of the input signal is brought in correspondence with each of the sections. The generator generates a signal indicating the amount of adjustment brought in correspondence with the target section as the control signal and provides the control signal to the adjuster. In this case, an operation speed in distortion compensation can be reduced.

(2) Preferably, the sections are not identical in length. In this case, the sections do not have to be identical in length.

(3) Preferably, the determination unit includes a comparator provided in correspondence with each of reference values that delimit the sections, the comparator provided in correspondence with each of the reference values is configured to compare the reference value with input power, and the generator determines the amount of adjustment brought in correspondence with the target section based on a result of comparison by the comparator. In this case, the sections can readily be determined.

(4) Preferably, the determination unit is configured to switch between a first mode for a first amplifier having a first characteristic and a second mode for a second amplifier having a second characteristic different from the first characteristic, in the first mode, the sections are set in accordance with the first characteristic, and in the second mode, the sections are set in accordance with the second characteristic. In this case, adaptation to amplifiers different in characteristics can be made.

(5) Preferably, the first characteristic is such a characteristic that variation in gain or phase with respect to electric power of the input signal is monotonous, and the second characteristic is such a characteristic that variation in gain or phase with respect to electric power of the input signal has an extreme value. In this case, adaptation to any of the characteristic exhibiting monotonous variation and the characteristic exhibiting an extreme value can be made.

(6) Preferably, the adjuster includes a first adjuster that receives a first input signal and adjusts at least one of an amplitude and a phase of the first signal and a second adjuster that receives a second input signal delayed or advanced as compared with the first input signal and adjusts at least one of an amplitude and a phase of the second signal, the controller includes a first controller and a second controller, each of the first controller and the second controller includes the determination unit and the generator, the determination unit of the first controller determines from among set sections, a target section corresponding to electric power of the first input signal as the input signal, and the determination unit of the second controller determines from among the set sections, a target section corresponding to electric power of the second input signal as the input signal. In this case, a memory effect of the amplifier can be compensated for.

(7) Preferably, the sections are adjustable. In this case, adaptation to variation in characteristic of the amplifier can be made.

(8) Preferably, the input signal is a wireless signal, and the controller is configured to obtain an electric power value of the input signal from the outside of the controller. In this case, an electric power value of the input signal is readily obtained.

(9) Preferably, a difference between a maximum value and a minimum value of the reference values that delimit the sections is not larger than 50 dB. In this case, the sections within an appropriate range are set.

(10) Preferably, the determination unit includes a first determination unit that determines a first target section corresponding to electric power of the input signal from among first sections set for adjustment of the amplitude and a second determination unit that determines a second target section corresponding to electric power of the input signal from among second sections set for adjustment of the phase, an amount of amplitude adjustment of the input signal is brought in correspondence with each of the first sections, an amount of phase adjustment of the input signal is brought in correspondence with each of the second sections, and the generator includes a first generator that generates an amplitude control signal indicating the amount of amplitude adjustment brought in correspondence with the first target section as the control signal and a second generator that generates a phase control signal indicating the amount of phase adjustment brought in correspondence with the second target section as the control signal. In this case, both of the amplitude and the phase are adjusted.

(11) A distortion compensation device according to an embodiment includes an adjuster including a first adjustment unit that adjusts at least one of an amplitude and a phase of an input signal and a controller. The controller includes a determination unit that determines a target section corresponding to electric power of the input signal from among set sections and a generator that generates a control signal. An amount of adjustment of at least one of the amplitude and the phase of the input signal is brought in correspondence with each of the sections. The generator generates a signal indicating the amount of adjustment brought in correspondence with the target section as the control signal and provides the control signal to the first adjustment unit. In this case, an operation speed in distortion compensation can be reduced.

(12) A communication device according to an embodiment includes an amplifier and a distortion compensation device that compensates for distortion of the amplifier. The distortion compensation device includes an adjuster that adjusts at least one of an amplitude and a phase of an input signal and a controller. The controller includes a determination unit that determines a target section corresponding to electric power of the input signal from among set sections and a generator that generates a control signal. An amount of adjustment of at least one of the amplitude and the phase of the input signal is brought in correspondence with each of the sections. The generator generates a signal indicating the amount of adjustment brought in correspondence with the target section as the control signal and provides the control signal to the adjuster. In this case, an operation speed in distortion compensation can be reduced.

(13) A method according to an embodiment is a method of adjusting an input signal for distortion compensation of an amplifier, and includes determining a target section corresponding to electric power of the input signal from among set sections and generating a control signal for adjusting at least one of an amplitude and a phase of the input signal. An amount of adjustment of at least one of the amplitude and the phase of the input signal is brought in correspondence with each of the sections. The control signal is generated as a signal indicating the amount of adjustment brought in correspondence with the target section. In this case, an operation speed in distortion compensation can be reduced.

Details of Embodiment of the Present Disclosure

An embodiment of the present disclosure will be described below with reference to the drawings. The same or corresponding elements in the drawings have the same reference characters allotted and description thereof will not be repeated. At least a part of the embodiment described below may be combined in any manner. FIG. 1 shows a communication device 10 according to an embodiment. Communication device 10 is used for wireless communication, and used, for example, as a base station or a user terminal in a mobile communication system. The user terminal wirelessly communicates with a base station. The mobile communication system is preferably a communication system of the fifth generation or a later generation, and it is, for example, the sixth generation mobile communication system.

Communication device 10 communicates preferably via millimeter waves or submillimeter waves or at a frequency shorter in wavelength than the submillimeter waves. In these frequency bands, a transmission capacity is high and high-speed communication can be established. The millimeter waves have a wavelength approximately from 10 mm to 1 mm. The millimeter waves have a frequency approximately from 30 GHz to 300 GHz. The submillimeter waves have a wavelength approximately from 1 mm to 0.1 mm. The submillimeter waves have a frequency approximately from 300 GHz to 3 THz. In which frequency band (the millimeter waves, the submillimeter waves, and the like) communication device 10 is used is pursuant to definition or usage of a frequency band (the millimeter waves, the submillimeter waves, and the like) under communication standards with which communication device 10 is in conformity.

Communication device 10 shown in FIG. 1 includes a distortion compensation circuit 12 and an amplifier 13. Distortion compensation circuit 12 compensates for distortion of amplifier 13. Distortion of amplifier 13 is expressed, for example, by an AM-AM characteristic and an AM-PM characteristic of the amplifier. The AM-AM characteristic represents a gain (AM-AM) with respect to input power of amplifier 13. The AM-PM characteristic represents a pass phase (AM-PM) with respect to input power of amplifier 13.

Distortion compensation circuit 12 shown in FIG. 1 is a circuit for pre-distortion. Distortion compensation circuit 12 provides a pre-distorted signal to amplifier 13. The pre-distorted signal is called a distortion-compensated signal. The distortion-compensated signal is a signal an amplitude or a phase of which is adjusted in advance in consideration of distortion to be caused in amplifier 13. Amplifier 13 amplifies the distortion-compensated signal and provides the amplified distortion-compensated signal. The signal provided from amplifier 13 is transmitted as a wireless signal from an antenna 14.

Communication device 10 shown in FIG. 1 further includes a baseband circuit 11. Baseband circuit 11 is a circuit that handles a baseband signal for a wireless signal. Baseband circuit 11 is a digital circuit that handles a digital signal. Baseband circuit 11 provides a baseband signal to distortion compensation circuit 12. The baseband signal includes a baseband_I signal and a baseband_Q signal. The baseband signal provided to distortion compensation circuit 12 is a digital signal. A baseband signal provided to distortion compensation circuit 12 is also referred to as a "pre-compensation signal" below. Distortion compensation circuit 12 generates a distortion-compensated signal by pre-distorting a pre-compensation signal.

Distortion compensation circuit 12 includes an I signal terminal 12A to which a baseband_I signal is provided and a Q signal terminal 12B to which a baseband_Q signal is provided. I signal terminal 12A is connected to baseband circuit 11 through a first baseband signal path 21. Q signal terminal 12B is connected to baseband circuit 11 through a second baseband signal path 22. Distortion compensation circuit 12 includes an output terminal 12C for output of a distortion-compensated signal. Output terminal 12C is connected to amplifier 13.

Baseband circuit 11 also functions as a control unit for distortion compensation circuit 12 or a distortion compensation device 100 which will be described later. Baseband circuit 11 as a control unit generates an electric power value of a pre-compensation signal and provides the electric power value to distortion compensation circuit 12. The electric power value provided to distortion compensation circuit 12 is a digital signal. The electric power value represents signal electric power (instantaneous electric power) that successively varies. Instantaneous electric power refers to electric power at a certain instant. Distortion compensation circuit 12 includes an electric power value terminal 12D to which an electric power value is provided. Electric power value terminal 12D is connected to baseband circuit 11 through an electric power value path 23.

Distortion compensation circuit 12 or distortion compensation device 100 which will be described later is configured to obtain an electric power value from baseband circuit 11 which is the control unit. Therefore, advantageously, a detector that detects an electric power value from a signal provided to distortion compensation device 100 does not have to be provided. Distortion compensation circuit 12 or distortion compensation device 100 which will be described later may include a detector that detects an electric power value from a signal provided to distortion compensation device 100.

Baseband circuit 11 as the control unit determines a reference value $V_{PD}^*$ for an electric power section which will be described later and provides the reference value to distortion compensation circuit 12 or distortion compensation device 100 which will be described later. Distortion compensation circuit 12 includes a reference value terminal 12E to which reference value $V_{PD}^*$ is provided. Reference value terminal 12E is connected to baseband circuit 11 through a reference value path 25. Baseband circuit 11 obtains an output signal from amplifier 13 as a training monitor signal through a training monitor path 24 for determining reference value $V_{PD}^*$ for the electric power section. Training monitor path 24 extends from an output side of amplifier 13 and is connected to baseband circuit 11. A method of determining reference value $V_{PD}^*$ for the electric power section based on the training monitor signal will be described later.

Figure 2:
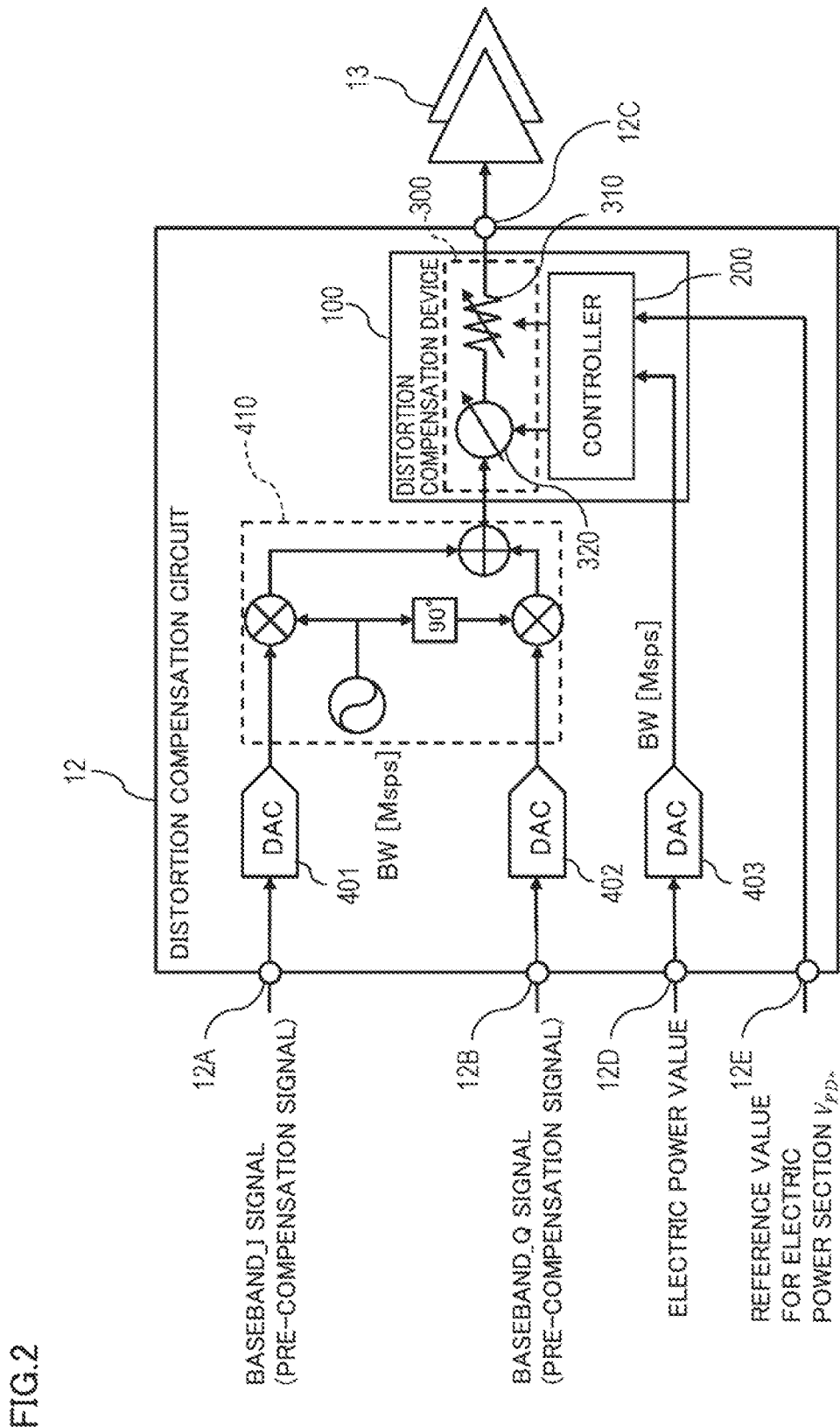
FIG. 2 is a diagram showing a configuration of a distortion compensation circuit.

As shown in FIG. 2, distortion compensation circuit 12 includes distortion compensation device 100 for pre-distortion. Distortion compensation circuit 12 includes digital/analog converters 401 and 402 (DACs 401 and 402) each of which converts a digital baseband signal provided to distortion compensation circuit 12 into an analog baseband signal. Distortion compensation circuit 12 further includes a quadrature modulator 410 that subjects an analog baseband signal provided from DAC 401 or 402 to quadrature modulation. Quadrature modulator 410 generates a quadrature-modulated signal from a baseband signal. In the embodiment, the quadrature-modulated signal is provided to distortion compensation device 100 as an input signal to distortion compensation device 100. Distortion compensation device 100 generates a distortion-compensated signal by subjecting the input signal to analog pre-distortion. The distortion-compensated signal is provided to amplifier 13.

Distortion compensation circuit 12 includes a digital/analog converter 403 that converts a digital electric power value provided to distortion compensation circuit 12 into an analog electric power value. The analog electric power value is provided to distortion compensation device 100 for distortion compensation. Reference value $V_{PD}^*$ provided to distortion compensation device 100 is given to distortion compensation device 100 for distortion compensation.

Distortion of amplifier 13 spreads over a band three to five times as wide as a bandwidth BW of a wireless signal. In general, in an attempt to compensate for distortion that spreads over a band five times as wide as bandwidth BW, a signal to be subjected to distortion compensation should also have a band five times as wide as the bandwidth of the wireless signal. In this case, each of DACs 401 and 402 that carries out DA conversion on a digital baseband signal to be subjected to distortion compensation should operate at a high speed of 5×BW [Msps].

In the present embodiment, however, an operation speed in distortion compensation is reduced as will be described later. Therefore, each of DACs 401 and 402 may operate at an operation speed (BW [Msps]) in accordance with bandwidth BW of the wireless signal. DAC 403 may also operate at an operation speed (BW [Msps]) in accordance with bandwidth BW of the wireless signal. Therefore, the operation speed of baseband circuit 11 can also be reduced. With reduction in operation speed, power consumption can also be reduced.

Distortion compensation device 100 shown in FIG. 2 includes a controller 200 and an adjuster 300. Distortion compensation device 100 according to the embodiment is an analog pre-distortion device. Adjuster 300 adjusts an input signal for pre-distortion of the amplifier in an analog manner. Controller 200 is a controller for adjuster 300 and controls an amount of adjustment in adjuster 300.

Adjuster 300 is configured to adjust at least one of an amplitude and a phase of an analog input signal provided to distortion compensation device 100. As at least one of the amplitude and the phase of the input signal is adjusted, a distortion-compensated signal is generated. The distortion compensation device shown in FIG. 2 is capable of adjusting both of the amplitude and the phase. Adjuster 300 includes a variable resistor 310 (an amplitude adjuster 310) for adjustment of the amplitude and a variable phase device 320 (a phase adjuster 320) for adjustment of the phase.

Controller 200 generates a control signal to be provided to adjuster 300 for adjusting at least one of the amplitude and the phase of the input signal. Controller 200 uses an electric power value for generation of a control signal. Specifically, controller 200 determines an amount of adjustment of the amplitude or the phase in accordance with the electric power value of the input signal. Controller 200 uses also reference value $V_{PD}^*$ for determining the amount of adjustment. Reference value $V_{PD}^*$ includes, for example, a reference value $V_{AM,PD}^*$ for determining an amount of adjustment of the amplitude and a reference value $V_{PM,PD}^*$ for determining an amount of adjustment of the phase. Reference value $V_{AM,PD}^*$ for determining the amount of adjustment of the amplitude and reference value $V_{PM,PD}^*$ for determining the amount of adjustment of the phase are different from each other.

Figure 3:
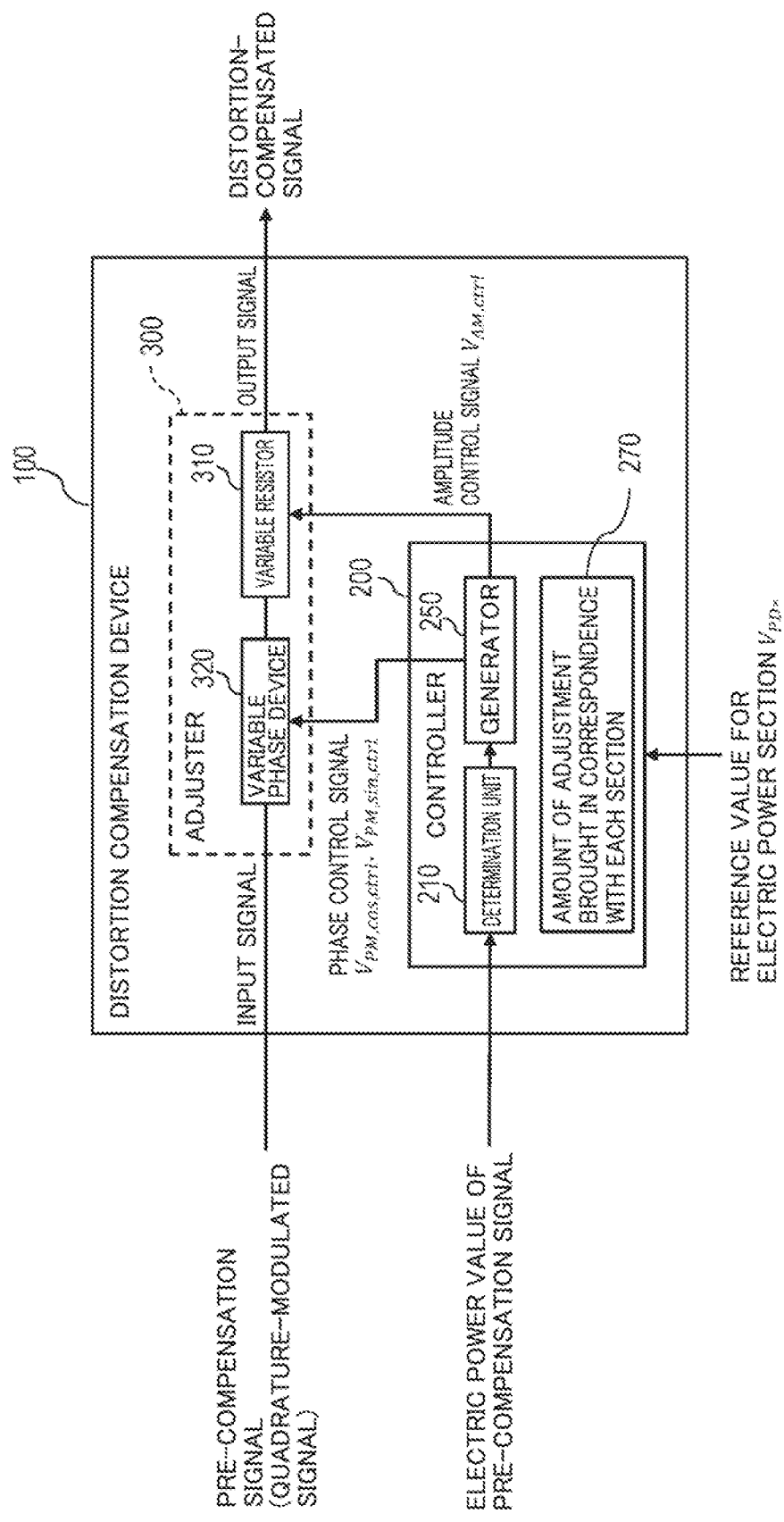
FIGS. 3 and 4 are diagrams showing a configuration of a distortion compensation device.

As shown in FIG. 3, controller 200 includes a determination unit 210 and a generator 250. For controller 200, an amount of adjustment 270 brought in correspondence with each of electric power sections D0, D1, D2, D3, and D4 which will be described later is set in advance. In the embodiment, set amount of adjustment 270 can include an amount of amplitude adjustment and an amount of phase adjustment. Correspondence between the electric power section and the amount of adjustment will also be described later. The amount of amplitude adjustment and the amount of phase adjustment are different from each other.

Determination unit 210 determines which target section among the electric power sections corresponds to a provided electric power value (electric power of an input signal). In this determination, any one of the electric power sections is selected as the target section. Generator 250 provides control signals $V_{AM,ctrl}$, $V_{PM,cos,ctrl}$, and $V_{PM,sin,ctrl}$ each representing the amount of adjustment brought in correspondence with the target section. The control signal includes an amplitude control signal $V_{AM,ctrl}$ provided to variable resistor 310 and phase control signals $V_{PM,cos,ctrl}$ and $V_{PM,sin,ctrl}$ provided to variable phase device 320. Variable resistor 310 adjusts the amplitude of the input signal based on variation in resistance in accordance with a provided amplitude control signal $V_{AM,ctrl}$. A gain characteristic of amplifier 13 is thus compensated for and linearized. Variable phase device 320 adjusts the phase of the input signal based on variation in pass phase in accordance with provided phase control signals $V_{PM,cos,ctrl}$ and $V_{PM,sin,ctrl}$. The phase characteristic of amplifier 13 is thus compensated for and linearized.

Figure 4:
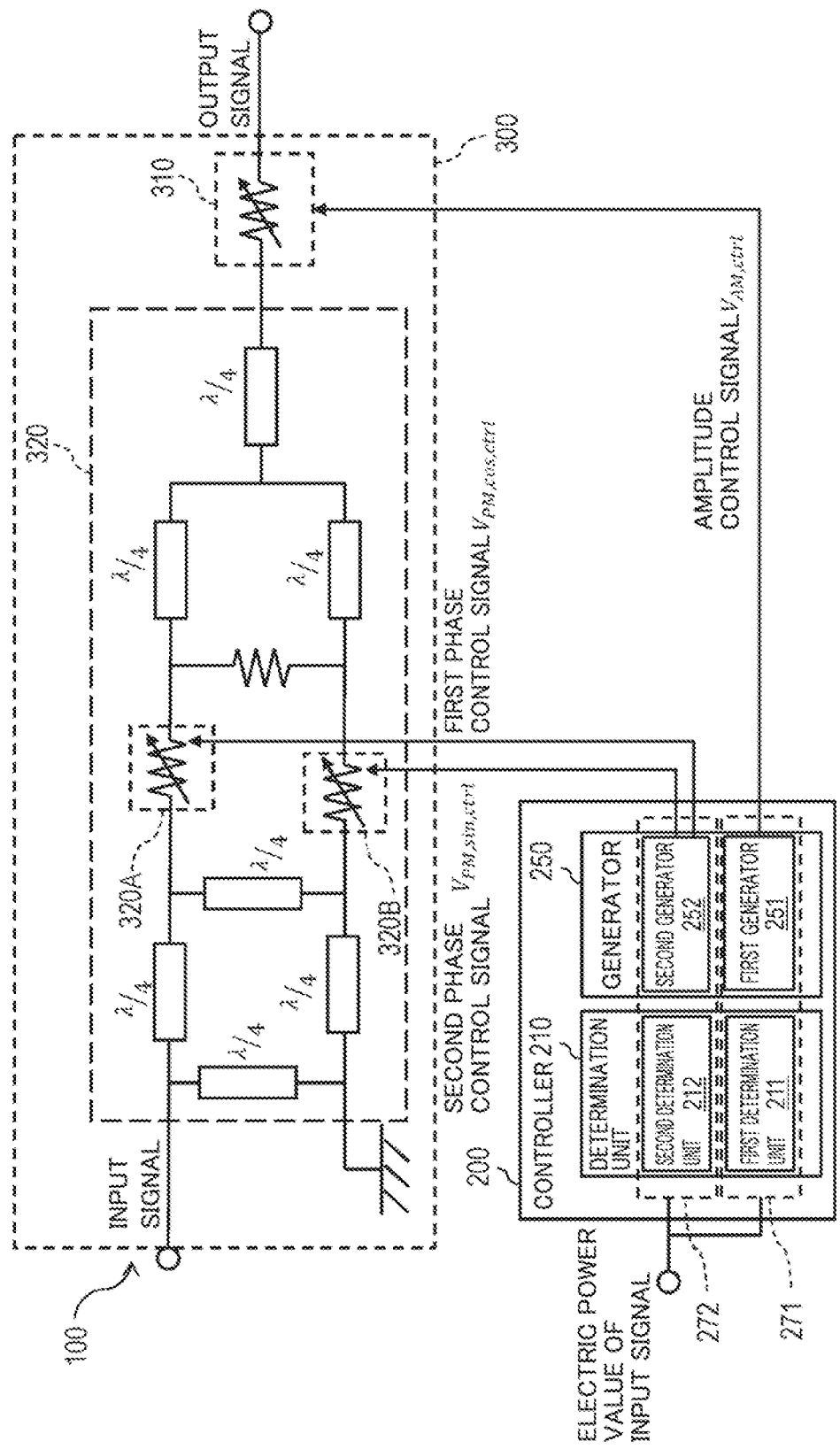

FIG. 4 shows exemplary variable resistor 310 and exemplary variable phase device 320. Variable resistor 310 is, for example, a variable voltage resistor 310. Variable voltage resistor 310 is varied in resistance value in accordance with a voltage of amplitude control signal $V_{AM,ctrl}$. The variable voltage resistor is implemented, for example, by a PIN diode PI Att. A variable resistor capable of operating at an operation speed in accordance with bandwidth BW of the wireless signal sufficiently serves as variable resistor 310.

As shown in FIG. 4, variable phase device 320 includes two variable resistors 320A and 320B in addition to λ/4 transmission lines. λ represents a wavelength corresponding to a frequency of a wireless signal (quadrature-modulated signal). The λ/4 transmission lines aim at equal distribution and equal synthesis of signals. Instead of the λ/4 transmission lines, an equal distribution resistor may be employed. Variable resistors 320A and 320B are, for example, variable voltage resistors 320A and 320B. Variable voltage resistor 320A is varied in resistance value in accordance with a voltage of phase control signal $V_{PM,cos,ctrl}$. Variable voltage resistor 320B is varied in resistance value in accordance with a voltage of phase control signal $V_{PM,sin,ctrl}$. With variation in resistance value of variable voltage resistors 320A and 320B, the pass phase of variable phase device 320 is varied. A variable resistor capable of operating at an operation speed in accordance with bandwidth BW of the wireless signal sufficiently serves as variable resistors 320A and 320B.

As shown in FIG. 4, determination unit 210 includes a first determination unit 211 and a second determination unit 212. Generator 250 of the controller according to the embodiment includes a first generator 251 and a second generator 252.

First determination unit 211 and first generator 251 are components for control of variable resistor 310. First determination unit 211 and first generator 251 are collectively referred to as a first sub controller 271 or an amplitude controller. First sub controller 271 linearizes a gain characteristic of amplifier 13 through control of variable resistor 310. First sub controller 271 may be called a gain linearization encoder.

Second determination unit 212 and second generator 252 are components for control of variable resistor 320A and variable resistor 320B. Second determination unit 212 and second generator 252 are collectively referred to as a second sub controller 272 or a phase controller. Second sub controller 272 linearizes a phase characteristic of amplifier 13 through control of variable resistors 320A and 320B. Second sub controller 272 may be called a phase linearization encoder.

As set forth above, controller 200 according to the embodiment includes first sub controller 271 and second sub controller 272. First sub controller 271 includes determination unit 211 and generator 251 and second sub controller 272 includes determination unit 212 and generator 252.

First sub controller 271 and second sub controller 272 independently generate control signal $V_{AM,ctrl}$ and control signals $V_{PM,cos,ctrl}$ and $V_{PM,sin,ctrl}$ from an electric power value, respectively. Specifically, first sub controller 271 generates control signal $V_{AM,ctrl}$ from the electric power value and second sub controller 272 generates control signals $V_{PM,cos,ctrl}$ and $V_{PM,sin,ctrl}$ from the electric power value.

Figure 5:
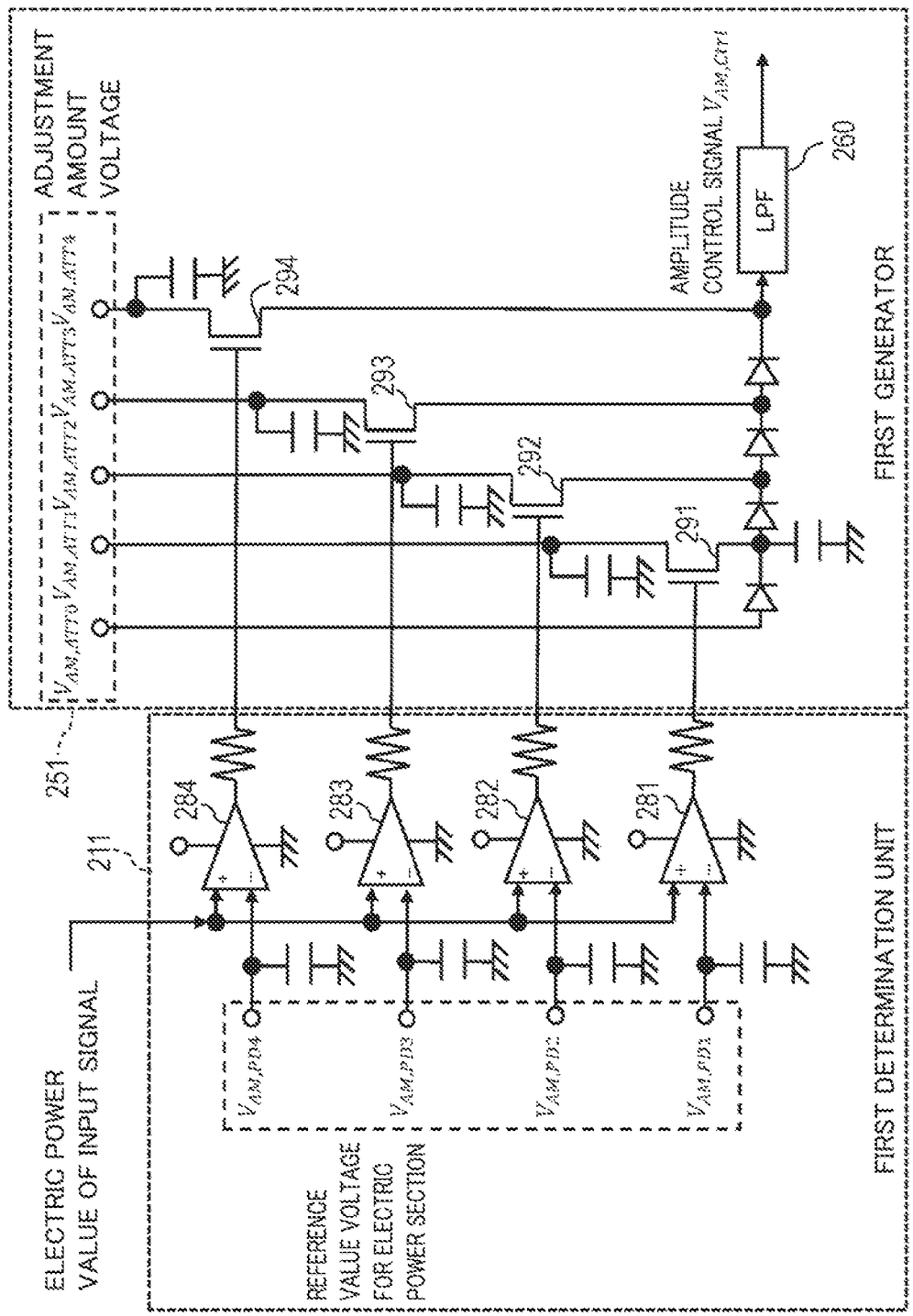
FIG. 5 is a circuit diagram of a controller.

FIG. 5 shows an exemplary circuit of determination unit 211 and generator 251 for first sub controller 271. FIG. 5 shows a reference value voltage $V_{AM,PD}*$ and an adjustment amount voltage $V_{AM,ATT}*$ for first sub controller 271. In the circuit shown in FIG. 5, * represents a natural number from one to four. Reference value voltage $V_{AM,PD}*$ and adjustment amount voltage $V_{AM,ATT}*$ each have a larger value as a value of * is larger by way of example. In other words, relation of $V_{AM,PD1}<V_{AM,PD2}<V_{AM,PD3}<V_{AM,PD4}$ is satisfied. In addition, relation of $V_{AM,ATT1}<V_{AM,ATT2}<V_{AM,ATT3}<V_{AM,ATT4}$ is satisfied. This example means that variable resistor 310 has such a characteristic that, as a voltage provided to variable resistor 310 is higher, an amount of attenuation by variable resistor 310 is larger. When variable resistor 310 has such a characteristic that the amount of attenuation by variable resistor 310 is smaller as the voltage provided to variable resistor 310 is higher, reference value voltage $V_{AM,PD}*$ and adjustment amount voltage $V_{AM,ATT}*$ should only have a smaller value as the value of * is larger. This is also applicable to variable resistors 320A and 320B.

First determination unit 211 includes comparators 281, 282, 283, and 284. Each of comparators 281, 282, 283, and 284 compares an electric power value of an input signal (input power) with reference value voltage $V_{AM,PD}*$. In comparison with reference value voltage $V_{AM,PD}*$, magnitude of the electric power value of the input signal is expressed as magnitude of a voltage. A voltage representing magnitude of an electric power value of an input signal is referred to as an input voltage below. Reference value voltage $V_{AM,PD}*$ is provided from baseband circuit 11 as described previously.

Each of comparators 281, 282, 283, and 284 included in determination unit 210 provides High as an output signal representing a result of comparison when magnitude of the voltage representing the electric power value of the input signal (input power) is larger than reference value voltage $V_{AM,PD}*$ and provides Low as the output signal representing the result of comparison when magnitude of the voltage is smaller than reference value voltage $V_{AM,PD}*$.

An output signal (High/Low) from each of comparators 281, 282, 283, and 284 is provided to generator 250. Generator 250 determines adjustment amount voltage $V_{AM,ATT}*$ brought in correspondence with the target section corresponding to input power (electric power of the input signal) represented by the electric power value based on the result of comparison by comparators 281, 282, 283, and 284, and generates control signal $V_{AM,ctrl}$.

Generator 250 includes switches 291, 292, 293, and 294. Switch 291 is configured such that, when a gate voltage is High, it is turned ON and an adjustment amount voltage $V_{AM,ATT1}$ appears at the source. Switch 292 is configured such that, when a gate voltage is High, it is turned ON and adjustment amount voltage $V_{AM,ATT2}$ appears at the source. Switch 293 is configured such that, when a gate voltage is High, it is turned ON and adjustment amount voltage $V_{AM,ATT3}$ appears at the source. Switch 294 is configured such that, when a gate voltage is High, it is turned ON and adjustment amount voltage $V_{AM,ATT4}$ appears at the source.

Switches 291, 292, 293, and 294 are provided such that outputs from comparators 281, 282, 283, and 284 (results of comparison) are provided to respective gates thereof. Switches 291, 292, 293, and 294 as many as comparators 281, 282, 283, and 284 are provided.

Comparators 281, 282, 283, and 284 as many as reference value voltages $V_{AM,PD}*$ are provided. In FIG. 5, for simplified illustration, four comparators 281, 282, 283, and 284 corresponding to four shown reference value voltages $V_{AM,PD1}$, $V_{AM,PD2}$, $V_{AM,PD3}$, and $V_{AM,PD4}$ are provided. The number of reference value voltages $V_{AM,PD}*$ is preferably not smaller than thirty and more preferably not smaller than sixty. The number of reference value voltages $V_{AM,PD}*$ is preferably not larger than three hundred, more preferably not larger than one hundred and fifty, and further preferably not larger than one hundred. The number of reference value voltages $V_{AM,PD}*$ may be set, for example, to sixty-four.

For example, input power is divided into five sections by four reference value voltages $V_{AM,PD1}$, $V_{AM,PD2}$, $V_{AM,PD3}$, and $V_{AM,PD4}$. Reference value electric power corresponding to reference value voltages $V_{AM,PD1}$, $V_{AM,PD2}$, $V_{AM,PD3}$, and $V_{AM,PD4}$ is expressed as $P(V_{AM,PD1})$, $P(V_{AM,PD2})$, $P(V_{AM,PD3})$, and $P(V_{AM,PD4})$. P represents a function for conversion into electric power with a voltage being defined as an argument. Specifically, $P(V_{AM,PD1})$ represents reference value electric power corresponding to reference value voltage $V_{AM,PD1}$. $P(V_{AM,PD2})$ represents reference value electric power corresponding to reference value voltage $V_{AM,PD2}$. $P(V_{AM,PD3})$ represents reference value electric power corresponding to reference value voltage $V_{AM,PD3}$. $P(V_{AM,PD4})$ represents reference value electric power corresponding to reference value voltage $V_{AM,PD4}$. Reference value electric power $P(V_{AM,PD1})$, $P(V_{AM,PD2})$, $P(V_{AM,PD3})$, and $P(V_{AM,PD4})$ is a threshold value for dividing a range of values that can be taken by electric power of an input signal (input power) into electric power sections D0, D1, D2, D3, and D4. A difference between $P(V_{AM,PD4})$ representing a maximum value (maximum electric power value) and $P(V_{AM,PD1})$ representing a minimum value (minimum electric power value) of the reference values that delimit the sections D0, D1, D2, D3, and D4 is preferably not larger than 50 dB.

The five sections are, for example, section D0 where input power is lower than $P(V_{AM,PD1})$, section D1 where input power is between $P(V_{AM,PD1})$ and $P(V_{AM,PD2})$, section D2 where input power is between $P(V_{AM,PD2})$ and $P(V_{AM,PD3})$, section D3 where input power is between $P(V_{AM,PD3})$ and $P(V_{AM,PD4})$, and section D4 where input power is higher than $P(V_{AM,PD4})$. Reference value voltages $V_{AM,PD1}$, $V_{AM,PD2}$, $V_{AM,PD3}$, and $V_{AM,PD4}$ serve as threshold values for delimiting sections D0, D1, D2, D3, and D4 with voltages (see FIG. 6). Four reference value voltages $V_{AM,PD1}$, $V_{AM,PD2}$, $V_{AM,PD3}$, and $V_{AM,PD4}$ are voltage values corresponding to electric power values indicating boundaries among five sections D0, D1, D2, D3, and D4.

Sections D0, D1, D2, D3, and D4 do not have to be identical in length but may be not identical in length. Sections D0, D1, D2, D3, and D4 being not identical in length means that all of sections D0, D1, D2, D3, and D4 are not equal in length and that at least one of sections D0, D1, D2, D3, and D4 is different in length from other sections included in sections D0, D1, D2, D3, and D4.

Figure 7:
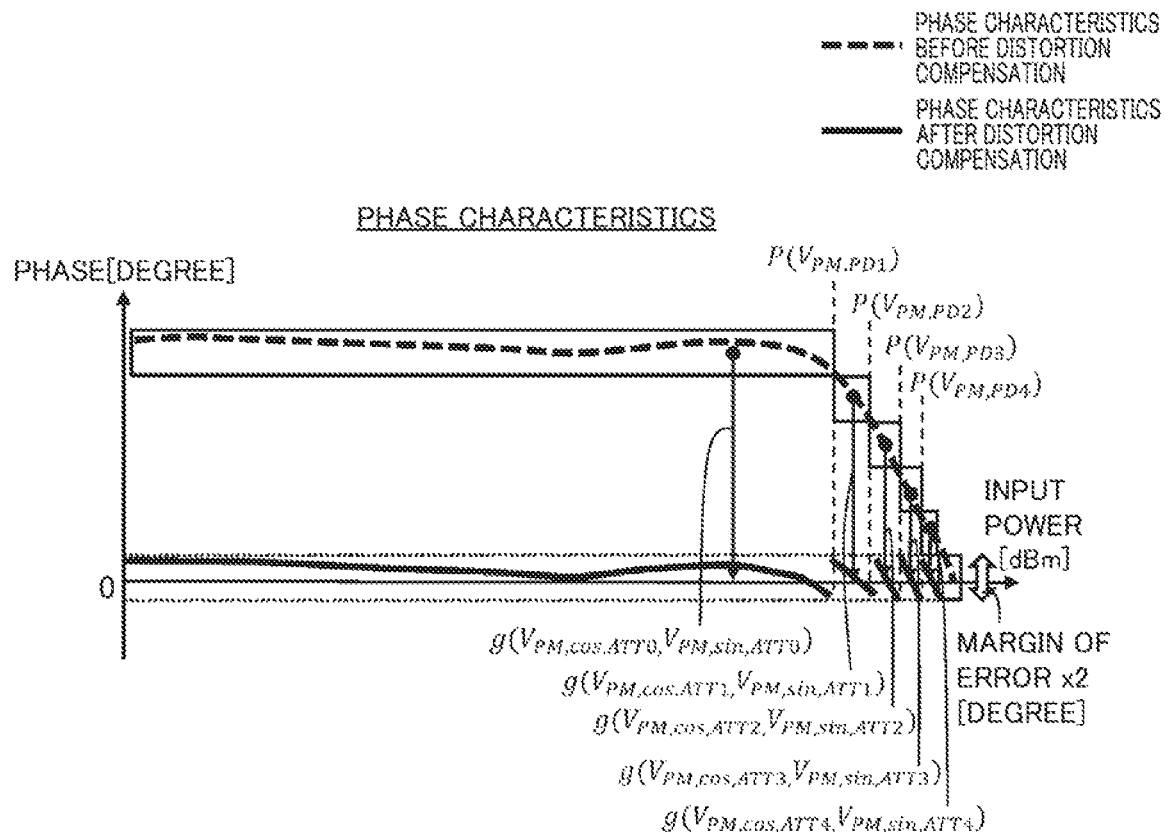
FIG. 7 is a diagram showing a phase compensation characteristic.

As shown in FIG. 7, reference value voltage $V_{AM,PD}*$ in first sub controller 271 for amplitude adjustment is different from reference value voltage $V_{PM,PD}*$ in second sub controller 272 for phase adjustment. Therefore, first sub controller 271 and second sub controller 272 are different from each other in length of set sections D0, D1, D2, D3, and D4. Sections set for first sub controller 271 for amplitude adjustment are also referred to as first sections. Sections set for second sub controller 272 for phase adjustment are also referred to as second sections. Each of the first sections is brought in correspondence with an amount of amplitude adjustment of an input signal and each of the second sections is brought in correspondence with an amount of phase adjustment of an input signal.

Figure 6:
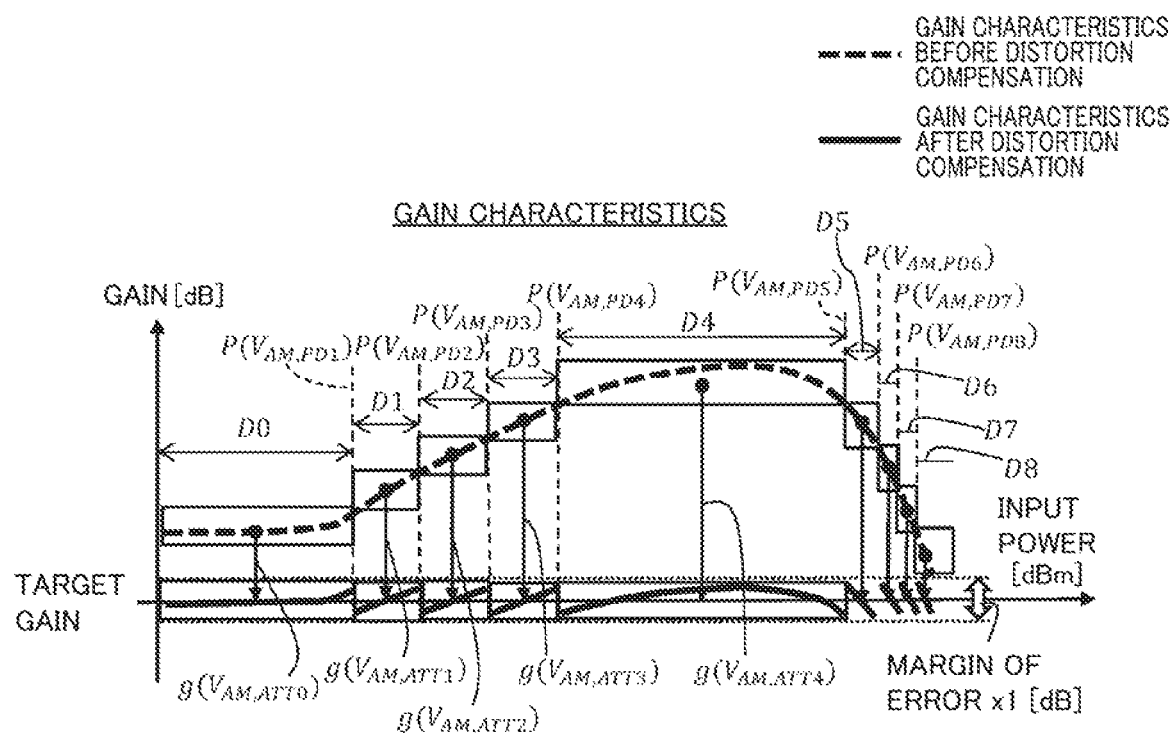
FIG. 6 is a diagram showing a gain compensation characteristic.

As shown in FIG. 6, for gain adjustment by first sub controller 271, an adjustment amount voltage $V_{AM,ATT0}$ is brought in correspondence with section D0, an adjustment amount voltage $V_{AM,ATT1}$ is brought in correspondence with section D1, an adjustment amount voltage $V_{AM,ATT2}$ is brought in correspondence with section D2, an adjustment amount voltage $V_{AM,ATT3}$ is brought in correspondence with section D3, and an adjustment amount voltage $V_{AM,ATT4}$ is brought in correspondence with section D4. A gain adjusted with the adjustment amount voltage is expressed as $g(V_{AM,ATT}*)$ where g represents a function for conversion into the gain with a voltage being defined as an argument.

Adjustment amount voltage $V_{AM,ATT0}$ brought in correspondence with section D0 serves to control variable resistor 310 such that the gain of amplifier 13 in section D0 is accommodated within an error margin $x_1$ [dB] with a target gain [dB] being defined as the center.

Adjustment amount voltage $V_{AM,ATT1}$ brought in correspondence with section D1 serves to control variable resistor 310 such that the gain of amplifier 13 in section D1 is accommodated within error margin $x_1$ [dB] with the target gain [dB] being defined as the center.

Adjustment amount voltage $V_{AM,ATT2}$ brought in correspondence with section D2 serves to control variable resistor 310 such that the gain of amplifier 13 in section D2 is accommodated within error margin $x_1$ [dB] with the target gain [dB] being defined as the center.

Adjustment amount voltage $V_{AM,ATT3}$ brought in correspondence with section D3 serves to control variable resistor 310 such that the gain of amplifier 13 in section D3 is accommodated within error margin $x_1$ [dB] with the target gain [dB] being defined as the center.

Adjustment amount voltage $V_{AM,ATT4}$ brought in correspondence with section D4 serves to control variable resistor 310 such that the gain of amplifier 13 in section D4 is accommodated within error margin $x_1$ [dB] with the target gain [dB] being defined as the center.

As shown in FIG. 7, for phase adjustment by second sub controller 272, for example, four reference value voltages $V_{PM,PD1}$, $V_{PM,PD2}$, $V_{PM,PD3}$, and $V_{PM,PD4}$ delimit five sections of input power. Reference value electric power corresponding to reference value voltages $V_{PM,PD1}$, $V_{PM,PD2}$, $V_{PM,PD3}$, and $V_{PM,PD4}$ is expressed as $P(V_{PM,PD1})$, $P(V_{PM,PD2})$, $P(V_{PM,PD3})$, and $P(V_{PM,PD4})$.

For phase adjustment as well, each section is brought in correspondence with adjustment amount voltages $V_{PM,cos,ATT}*$ and $V_{PM,sin,ATT}*$. Adjustment amount voltage $V_{PM,cos,ATT}*$ is used for determining a first phase control signal $V_{PM,cos,ctrl}$. Adjustment amount voltage $V_{PM,sin,ATT}*$ is used for determining a second phase control signal $V_{PM,sin,ctrl}$. A gain adjusted with the adjustment amount voltage is expressed as $g(V_{PM,cos,PD}*, V_{PM,sin,PD}*)$ where g represents a function for conversion into a phase with the voltage being defined as an argument. The gain adjusted with the adjustment amount voltage is expressed as $g(V_{AM,PD}*)$.

Adjustment amount voltages $V_{PM,cos,ATT}*$ and $V_{PM,sin,ATT}*$ brought in correspondence with each section are voltages for control of variable phase device 320 such that a phase of amplifier 13 in each section is accommodated within an error margin $x_2$ [degree] with 0 [degree] being defined as the center.

Figure 8:
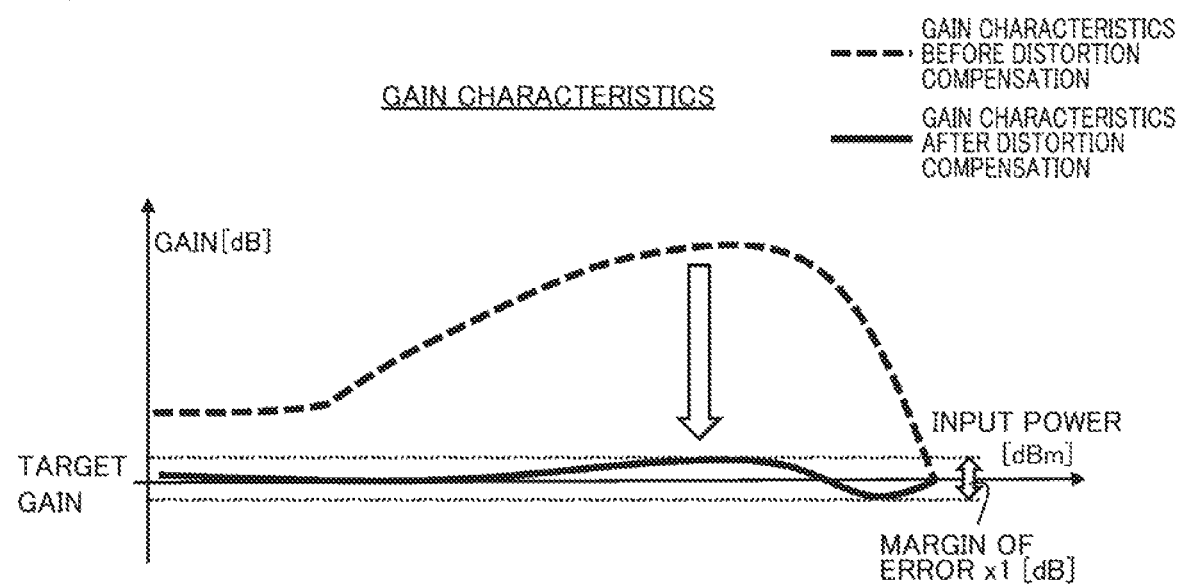
FIG. 8 is a diagram showing a gain characteristic of an amplifier.
Figure 9:
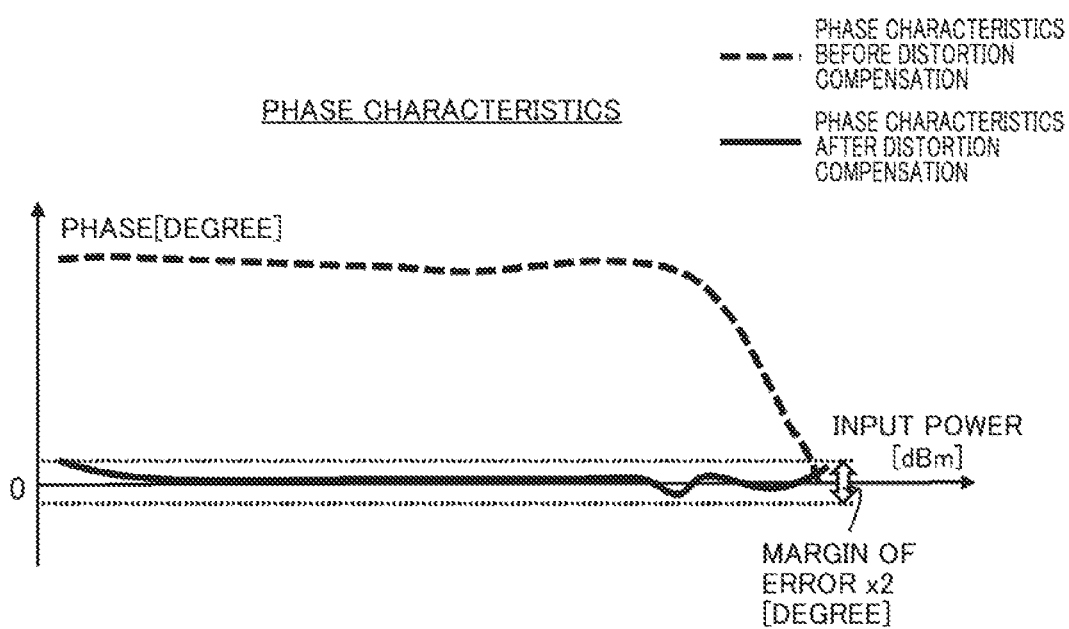
FIG. 9 is a diagram showing a phase characteristic of the amplifier.

As shown in FIGS. 8 and 9, general distortion compensation is analog distortion compensation for generally linearizing a non-linear characteristic before distortion compensation. In contrast, in distortion compensation in the embodiment, a non-linear characteristic is compensated for by a single amount of adjustment $V_{ATT}*$ brought in correspondence with each of sections D0, D1, D2, D3, and D4. Therefore, as shown in FIGS. 6 and 7, in distortion compensation in the embodiment, the non-linear characteristic before distortion compensation is not generally linear but is zigzagged. The gain and the phase, however, are accommodated in allowable error margins $x_1$ and $x_2$. Therefore, performance of distortion compensation is equivalent to distortion compensation shown in FIGS. 8 and 9. Thus, general distortion compensation is such analog distortion compensation that achieves general linearization, whereas distortion compensation in the embodiment is such digital distortion compensation that compensation for each section is made. Since compensation is made for each section in the embodiment, control may be rough and an operation speed (band) for control is reduced.

FIG. 6 shows sections D5, D6, D7, and D8 for description which will be provided later, and sections D5, D6, D7, and D8 are brought in correspondence with adjustment amount voltages $V_{AM,ATT3}$, $V_{AM,ATT2}$, $V_{AM,ATT1}$, and $V_{AM,ATT0}$, respectively. In the description with reference to FIG. 5, however, for simplified illustration, sections D5, D6, D7, and D8 are ignored. The adjustment amount voltage below refers to an amplitude adjustment voltage. Though FIG. 6 shows amplitude adjustment amount voltages $V_{AM,ATT0}$, $V_{AM,ATT1}$, $V_{AM,ATT2}$, $V_{AM,ATT3}$, and $V_{AM,ATT4}$ brought in correspondence with first sections D0, D1, D2, D3, and D4 in amplitude adjustment (gain control), phase adjustment amount voltages $V_{PM,ATT0}$, $V_{PM,ATT1}$, $V_{PM,ATT2}$, $V_{PM,ATT3}$, and $V_{PM,ATT4}$ are also similarly brought in correspondence with second sections D0, D1, D2, D3, and D4 for phase adjustment, respectively.

As described previously, reference value voltages $V_{AM,PD1}$, $V_{AM,PD2}$, $V_{AM,PD3}$, and $V_{AM,PD4}$ are adaptively adjusted during operations of amplifier 13 by baseband circuit 11 based on the training monitor signal. This is also applicable to reference value voltage $V_{PM,PD}^*$. Baseband circuit 11 can determine reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ as below. Initially, baseband circuit 11 calculates a model of amplifier 13 from a baseband signal which is a wireless signal and a training monitor signal. The model of amplifier 13 is expressed, for example, by a polynomial. A coefficient included in the polynomial is determined from the baseband signal which is the wireless signal and the training monitor signal. In succession, baseband circuit 11 obtains a gain characteristic (AM-AM) as shown in FIG. 8 and a phase characteristic (AM-PM) as shown in FIG. 9 by using the model of amplifier 13.

Then, baseband circuit 11 determines section D0 adjusted with amplitude adjustment amount voltage $V_{ATT0}$, section D1 adjusted with amplitude adjustment amount voltage $V_{ATT1}$, section D2 adjusted with amplitude adjustment amount voltage $V_{ATT2}$, section D3 adjusted with amplitude adjustment amount voltage $V_{ATT3}$, and section D4 adjusted with amplitude adjustment amount voltage $V_{ATT4}$ based on the obtained gain characteristic, and determines reference value electric power P [dB] defined as the threshold value for delimiting sections D0, D1, D2, D3, and D4. Sections D0, D1, D2, D3, and D4 are determined such that the adjusted gain or phase is accommodated within error margin $x_1$ or $x_2$.

Then, baseband circuit 11 obtains reference value voltages $V_{AM,PD1}$, $V_{AM,PD2}$, $V_{AM,PD3}$, and $V_{AM,PD4}$ for amplitude adjustment by converting reference value electric power P [dB] into a voltage value [V]. Similarly, reference value voltages $V_{PM,PD1}$, $V_{PM,PD2}$, $V_{PM,PD3}$, and $V_{PM,PD4}$ for phase adjustment are obtained from the obtained phase characteristic.

Reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ may be determined by baseband circuit 11 based on a training monitor signal, with a method below. In the method described below, the model of amplifier 13 is not used. Initially, baseband circuit 11 measures a gain characteristic (AM-AM) and a phase characteristic (AM-PM) of amplifier 13 from a training monitor signal. Then, baseband circuit 11 slightly varies the values of reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$. Then, baseband circuit 11 measures again the gain characteristic (AM-AM) and the phase characteristic (AM-PM). When the gain in the gain characteristic is improved toward the target gain or the phase in the phase characteristic is improved in a direction closer to 0, variation in reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ is reflected. When the gain or the phase deteriorates, original reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ before variation are adopted. By repeating a procedure above, optimized reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ are obtained. Reference value voltages $V_{AM,PD1}$, $V_{AM,PD2}$, $V_{AM,PD3}$, and $V_{AM,PD4}$ for amplitude adjustment and reference value voltages $V_{PM,PD1}$, $V_{PM,PD2}$, $V_{PM,PD3}$, and $V_{PM,PD4}$ for phase adjustment may be determined independently of each other.

During operations of amplifier 13, a target section to which electric power of an input signal belongs is determined based on reference value voltages $V_{AM,PD1}$, $V_{AM,PD2}$, $V_{AM,PD3}$, $V_{AM,PD4}$, $V_{PM,PD1}$, $V_{PM,PD2}$, $V_{PM,PD3}$, and $V_{PM,PD4}$ determined as above.

For example, when electric power of an input signal is within section D0, determination unit 210 (first determination unit 211 and second determination unit 212) determines section D0 as the target section (the first target section or the second target section). When 0th section D0 is determined as the target section, first generator 251 generates control signal $V_{AM,ctrl}$ having adjustment amount voltage $V_{AM,ATT0}$. Second generator 252 generates control signal $V_{PM,cos,ctrl}$ having adjustment amount voltage $V_{PM,cos,ATT0}$ and control signal $V_{PM,sin,ctrl}$ having adjustment amount voltage $V_{PM,sin,ATT0}$. Each control signal is provided through a low-pass filter 260.

Specifically, in connection with the gain, when electric power of the input signal is within section D0, a voltage representing an electric power value of the input signal (input power) is lower than $V_{AM,PD1}$, $V_{AM,PD2}$, $V_{AM,PD3}$, and $V_{AM,PD4}$. Therefore, outputs (results of comparison) from comparators 281, 282, 283, and 284 shown in FIG. 5 are all Low. Consequently, switches 291, 292, 293, and 294 shown in FIG. 5 are all turned OFF. Therefore, control signal $V_{AM,ctrl}$ having adjustment amount voltage $V_{AM,ATT0}$ is provided. This is also applicable to the phase.

When electric power of the input signal is within section D1, determination unit 210 (first determination unit 211 and second determination unit 212) determines section D1 as the target section (the first target section or the second target section). When section D1 is determined as the target section, first generator 251 generates control signal $V_{AM,ctrl}$ having adjustment amount voltage $V_{AM,ATT1}$. Second generator 252 generates control signal $V_{PM,cos,ctrl}$ having adjustment amount voltage $V_{PM,cos,ATT1}$ and control signal $V_{PM,sin,ctrl}$ having adjustment amount voltage $V_{PM,sin,ATT1}$.

Specifically, in connection with the gain, when electric power of the input signal is within section D1, a voltage representing an electric power value of the input signal (input power) is higher than $V_{AM,PD1}$ and lower than $V_{AM,PD2}$, $V_{AM,PD3}$, and $V_{AM,PD4}$. Therefore, an output (a result of comparison) from comparator 281 is High, whereas outputs (results of comparison) from comparators 282, 283, and 284 are all Low. Consequently, switch 291 is turned ON whereas switches 292, 293, and 294 are all turned OFF. Therefore, control signal $V_{AM,ctrl}$ having adjustment amount voltage $V_{AM,ATT1}$ is provided. This is also applicable to the phase.

When electric power of the input signal is within section D2, determination unit 210 (first determination unit 211 and second determination unit 212) determines section D2 as the target section (the first target section or the second target section). When section D2 is determined as the target section, first generator 251 generates control signal $V_{AM,ctrl}$ having adjustment amount voltage $V_{AM,ATT2}$. Second generator 252 generates control signal $V_{PM,cos,ctrl}$ having adjustment amount voltage $V_{PM,cos,ATT2}$ and control signal $V_{PM,sin,ctrl}$ having adjustment amount voltage $V_{PM,sin,ATT2}$.

Specifically, in connection with the gain, when electric power of the input signal is within section D2, a voltage representing an electric power value of the input signal (input power) is higher than $V_{AM,PD1}$ and $V_{AM,PD2}$ and lower than $V_{AM,PD3}$ and $V_{AM,PD4}$. Therefore, outputs (results of comparison) from comparators 281 and 282 are High, whereas outputs (results of comparison) from comparators 283 and 284 are Low. Consequently, switches 291 and 292 are turned ON, whereas switches 293 and 294 are turned OFF. Therefore, control signal $V_{AM,ctrl}$ having adjustment amount voltage $V_{AM,ATT2}$ is provided. This is also applicable to the phase.

When electric power of the input signal is within section D3, determination unit 210 (first determination unit 211 and second determination unit 212) determines section D3 as the target section (the first target section or the second target section). When section D3 is determined as the target section, first generator 251 generates control signal $V_{AM,ctrl}$ having adjustment amount voltage $V_{AM,ATT3}$. Second generator 252 generates control signal $V_{PM,cos,ctrl}$ having adjustment amount voltage $V_{PM,cos,ATT3}$ and control signal $V_{PM,sin,ctrl}$ having adjustment amount voltage $V_{PM,sin,ATT3}$.

Specifically, in connection with the gain, when electric power of the input signal is within section D3, a voltage representing an electric power value of the input signal (input power) is higher than $V_{AM,PD1}$, $V_{AM,PD2}$, and $V_{AM,PD3}$ and lower than $V_{AM,PD4}$. Therefore, outputs (results of comparison) from comparators 281, 282, and 283 are High, whereas an output (a result of comparison) from comparator 284 is Low. Consequently, switches 291, 292, and 293 are turned ON, whereas switch 294 is turned OFF. Therefore, control signal $V_{AM,ctrl}$ having adjustment amount voltage $V_{AM,ATT3}$ is provided. This is also applicable to the phase.

When electric power of the input signal is within section D4, determination unit 210 (first determination unit 211 and second determination unit 212) determines section D4 as the target section (the first target section or the second target section). When section D4 is determined as the target section, first generator 251 generates control signal $V_{AM,ctrl}$ having adjustment amount voltage $V_{AM,ATT4}$. Second generator 252 generates control signal $V_{PM,cos,ctrl}$ having adjustment amount voltage $V_{PM,cos,ATT4}$ and control signal $V_{PM,sin,ctrl}$ having adjustment amount voltage $V_{PM,sin,ATT4}$.

Specifically, in connection with the gain, when electric power of the input signal is within section D4, a voltage representing an electric power value of the input signal (input power) is higher than $V_{AM,PD1}$, $V_{AM,PD2}$, $V_{AM,PD3}$, and $V_{AM,PD4}$. Therefore, outputs (results of comparison) from comparators 281, 282, 283, and 284 are all High. Consequently, switches 291, 292, 293, and 294 are all turned ON. Therefore, control signal $V_{AM,ctrl}$ having adjustment amount voltage $V_{AM,ATT4}$ is provided. This is also applicable to the phase.

As adjuster 300 is controlled by the control signal generated as above, the gain or the phase can be accommodated within error margin $x_1$ or $x_2$.

The circuit in FIG. 5 is a circuit for a case where amplifier 13 has such a characteristic (first characteristic) that the gain (or the phase) is monotonously varied. Monotonous variation refers to monotonous increase or monotonous decrease. In the case of amplifier 13 with the first characteristic, variation in gain or phase with respect to electric power of the input signal is monotonous.

Figure 10:
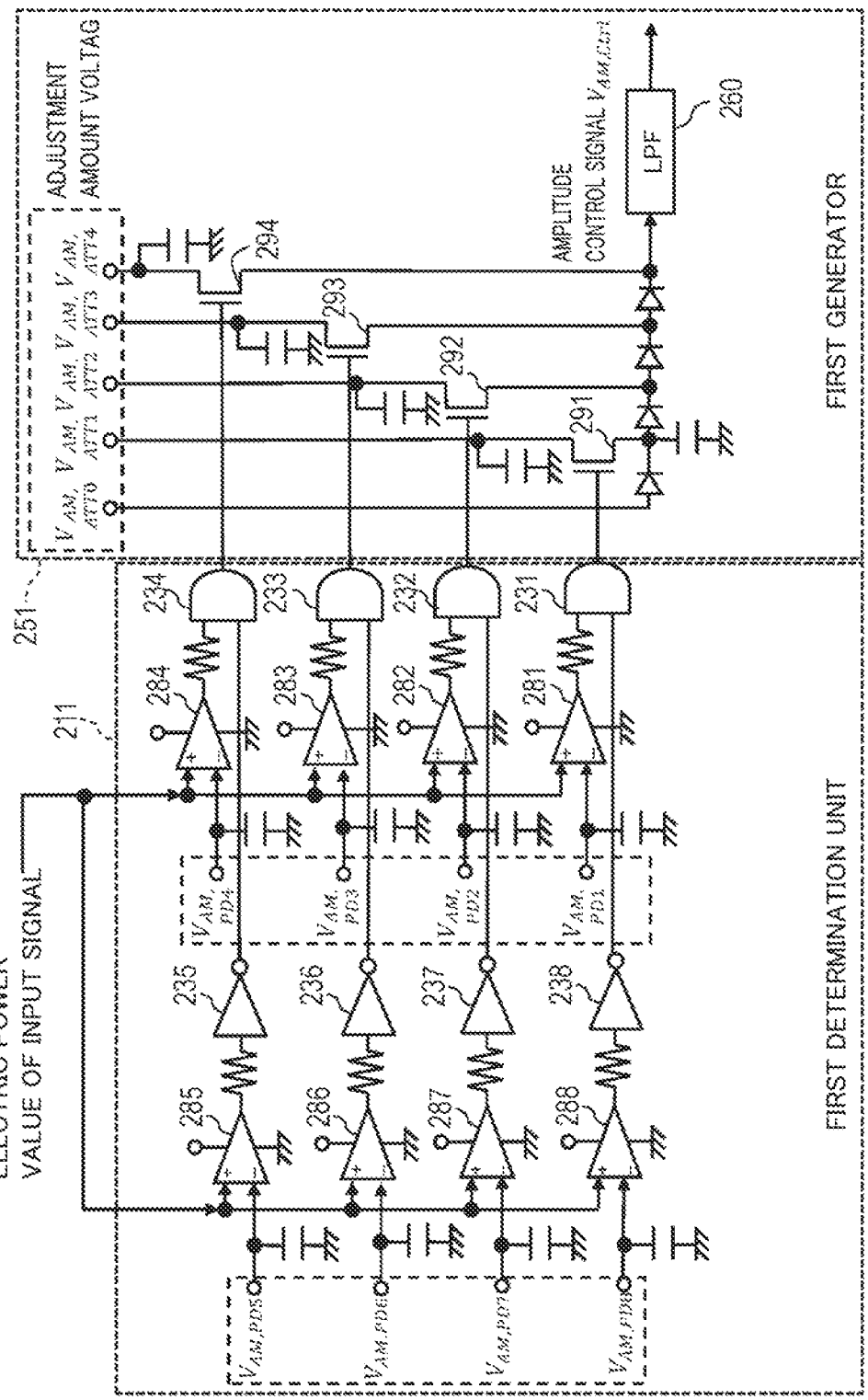
FIG. 10 shows a circuit of a controller.

The circuit in FIG. 10 is a circuit for a case where amplifier 13 has such a characteristic (second characteristic) that variation in gain or phase with respect to electric power of the input signal has an extreme value. The extreme value refers to a relative maximum value or a relative minimum value. In the gain characteristic shown in FIG. 6, the gain has a relative maximum value within section D4. The circuit in FIG. 5 can address distortion compensation from section D0 to section D4 among the sections shown in FIG. 6, whereas the circuit in FIG. 10 address distortion compensation from section D0 to section D8 shown in FIG. 6.

The circuit in FIG. 10 is the same as the circuit in FIG. 5 except for comparators 285, 286, 287, and 288, NOT gates 235, 236, 237, and 238, and AND gates 231, 232, 233, and 234 added thereto.

During operations of amplifier 13, a target section to which electric power of an input signal belongs is determined from among sections D0, D1, D2, D3, D4, D5, D6, D7, and D8 based on reference value voltages $V_{AM,PD1}$, $V_{AM,PD2}$, $V_{AM,PD3}$, $V_{AM,PD4}$, $V_{AM,PD5}$, $V_{AM,PD6}$, $V_{AM,PD7}$, and $V_{AM,PD8}$. By way of example, relation of $V_{AM,PD1} < V_{AM,PD2} < V_{AM,PD3} < V_{AM,PD4} < V_{AM,PD5} < V_{AM,PD6} < V_{AM,PD7} < V_{AM,PD8}$ is satisfied.

When electric power of the input signal is within a range from section D0 to section D4, a voltage representing an electric power value of the input signal (input power) is lower than $V_{AM,PD5}$, $V_{AM,PD6}$, $V_{AM,PD7}$, and $V_{AM,PD8}$. Therefore, outputs from comparators 285, 286, 287, and 288 are all Low. Outputs from NOT gates 235, 236, 237, and 238 that make determination as to outputs from comparators 285, 286, 287, and 288 are all High. Therefore, when electric power of the input signal is within the range from section D0 to section D4, High is provided from NOT gates 235, 236, 237, and 238 to AND gates 231, 232, 233, and 234. Consequently, when electric power of the input signal is within a range from section D0 to section D4, the circuit in FIG. 10 is equivalent to the circuit in FIG. 5 and a control signal is provided as described with reference to FIG. 5.

When electric power of the input signal is within section D5, determination unit 210 (first determination unit 211 and second determination unit 212) determines section D5 as the target section (the first target section or the second target section). When section D5 is determined as the target section, first generator 251 generates control signal $V_{AM,ctrl}$ having adjustment amount voltage $V_{ATT3}$. Second generator 252 generates control signal $V_{PM,cos,ctrl}$ having adjustment amount voltage $V_{PM,cos,ATT3}$ and control signal $V_{PM,sin,ctrl}$ having adjustment amount voltage $V_{PM,sin,ATT3}$.

Specifically, in connection with the gain, when electric power of the input signal is within section D5, a voltage representing the electric power value of the input signal (input power) is higher than $V_{AM,PD1}$, $V_{AM,PD2}$, $V_{AM,PD3}$, $V_{AM,PD4}$, and $V_{AM,PD5}$ and lower than $V_{AM,PD6}$, $V_{AM,PD7}$, and $V_{AM,PD8}$. Outputs from comparators 281, 282, 283, and 284 are all High and an output from comparator 285 is also High. Outputs from comparators 286, 287, and 288 are Low. In this case, an output from NOT gate 235 is Low, whereas outputs from NOT gates 236, 237, and 238 are High. Consequently, an output from AND gate 234 is Low, and outputs from other AND gates 231, 232, and 233 are High. Therefore, control signal $V_{AM,ctrl}$ having adjustment amount voltage $V_{AM,ATT3}$ is provided. This is also applicable to the phase.

When electric power of the input signal is within section D6, determination unit 210 (first determination unit 211 and second determination unit 212) determines section D6 as the target section (the first target section or the second target section). When section D6 is determined as the target section, first generator 251 generates control signal $V_{AM,ctrl}$ having adjustment amount voltage $V_{ATT2}$. Second generator 252 generates control signal $V_{PM,cos,ctrl}$ having adjustment amount voltage $V_{PM,cos,ATT2}$ and control signal $V_{PM,sin,ctrl}$ having adjustment amount voltage $V_{PM,sin,ATT2}$.

Specifically, in connection with the gain, when electric power of the input signal is within section D6, a voltage representing the electric power value of the input signal (input power) is higher than $V_{AM,PD1}$, $V_{AM,PD2}$, $V_{AM,PD3}$, $V_{AM,PD4}$, $V_{AM,PD5}$, and $V_{AM,PD6}$ and lower than $V_{AM,PD7}$ and $V_{AM,PD8}$. Outputs from comparators 281, 282, 283, and 284 are all High and outputs from comparators 285 and 286 are also High. Outputs from comparators 287 and 288 are Low. In this case, outputs from NOT gates 235 and 236 are Low, whereas outputs from NOT gates 237 and 238 are High. Consequently, outputs from AND gates 233 and 234 are Low and outputs from other AND gates 231 and 232 are High. Therefore, control signal $V_{AM,ctrl}$ having adjustment amount voltage $V_{AM,ATT2}$ is provided. This is also applicable to the phase.

When electric power of the input signal is within section D7, determination unit 210 (first determination unit 211 and second determination unit 212) determines section D7 as the target section (the first target section or the second target section). When section D7 is determined as the target section, first generator 251 generates control signal $V_{AM,ctrl}$ having adjustment amount voltage $V_{ATT1}$. Second generator 252 generates control signal $V_{PM,cos,ctrl}$ having adjustment amount voltage $V_{PM,cos,ATT1}$ and control signal $V_{PM,sin,ctrl}$ having adjustment amount voltage $V_{PM,sin,ATT1}$.

Specifically, in connection with the gain, when electric power of the input signal is within section D7, a voltage representing the electric power value of the input signal (input power) is higher than $V_{AM,PD1}$, $V_{AM,PD2}$, $V_{AM,PD3}$, $V_{AM,PD4}$, $V_{AM,PD5}$, $V_{AM,PD6}$, and $V_{AM,PD7}$ and lower than $V_{AM,PD8}$. Outputs from comparators 281, 282, 283, and 284 are all High and outputs from comparators 285, 286, and 287 are also High. An output from comparator 288 is Low. In this case, outputs from NOT gates 235, 236, and 237 are Low, whereas an output from NOT gate 238 is High. Consequently, outputs from AND gates 232, 233, and 234 are Low, and an output from another AND gate 231 is High. Therefore, control signal $V_{AM,ctrl}$ having adjustment amount voltage $V_{AM,ATT1}$ is provided. This is also applicable to the phase.

When electric power of the input signal is within section D8, determination unit 210 (first determination unit 211 and second determination unit 212) determines section D8 as the target section (the first target section or the second target section). When section D8 is determined as the target section, first generator 251 generates control signal $V_{AM,ctrl}$ having adjustment amount voltage $V_{ATT0}$. Second generator 252 generates control signal $V_{PM,cos,ctrl}$ having adjustment amount voltage $V_{PM,cos,ATT0}$ and control signal $V_{PM,sin,ctrl}$ having adjustment amount voltage $V_{PM,sin,ATT0}$.

Specifically, in connection with the gain, when electric power of the input signal is within section D8, a voltage representing the electric power value of the input signal (input power) is higher than $V_{AM,PD1}$, $V_{AM,PD2}$, $V_{AM,PD3}$, $V_{AM,PD4}$, $V_{AM,PD5}$, $V_{AM,PD6}$, $V_{AM,PD7}$, and $V_{AM,PD8}$. Therefore, outputs from comparators 281, 282, 283, and 284 are all High and outputs from comparators 285, 286, 287, and 288 are also High. In this case, outputs from NOT gates 235, 236, 237, and 238 are all Low. Consequently, outputs from AND gates 231, 232, 233, and 234 are all Low. Therefore, control signal $V_{AM,ctrl}$ having adjustment amount voltage $V_{AM,ATT0}$ is provided. This is also applicable to the phase.

By setting relation, for example, of $V_{AM,PD1} > V_{AM,PD2} > V_{AM,PD3} > V_{AM,PD4} > V_{AM,PD5} > V_{AM,PD6} > V_{AM,PD7} > V_{AM,PD8}$ in the circuit shown in FIG. 10, adaptation to the characteristic (second characteristic) having a relative minimum value can be made.

Figure 11:
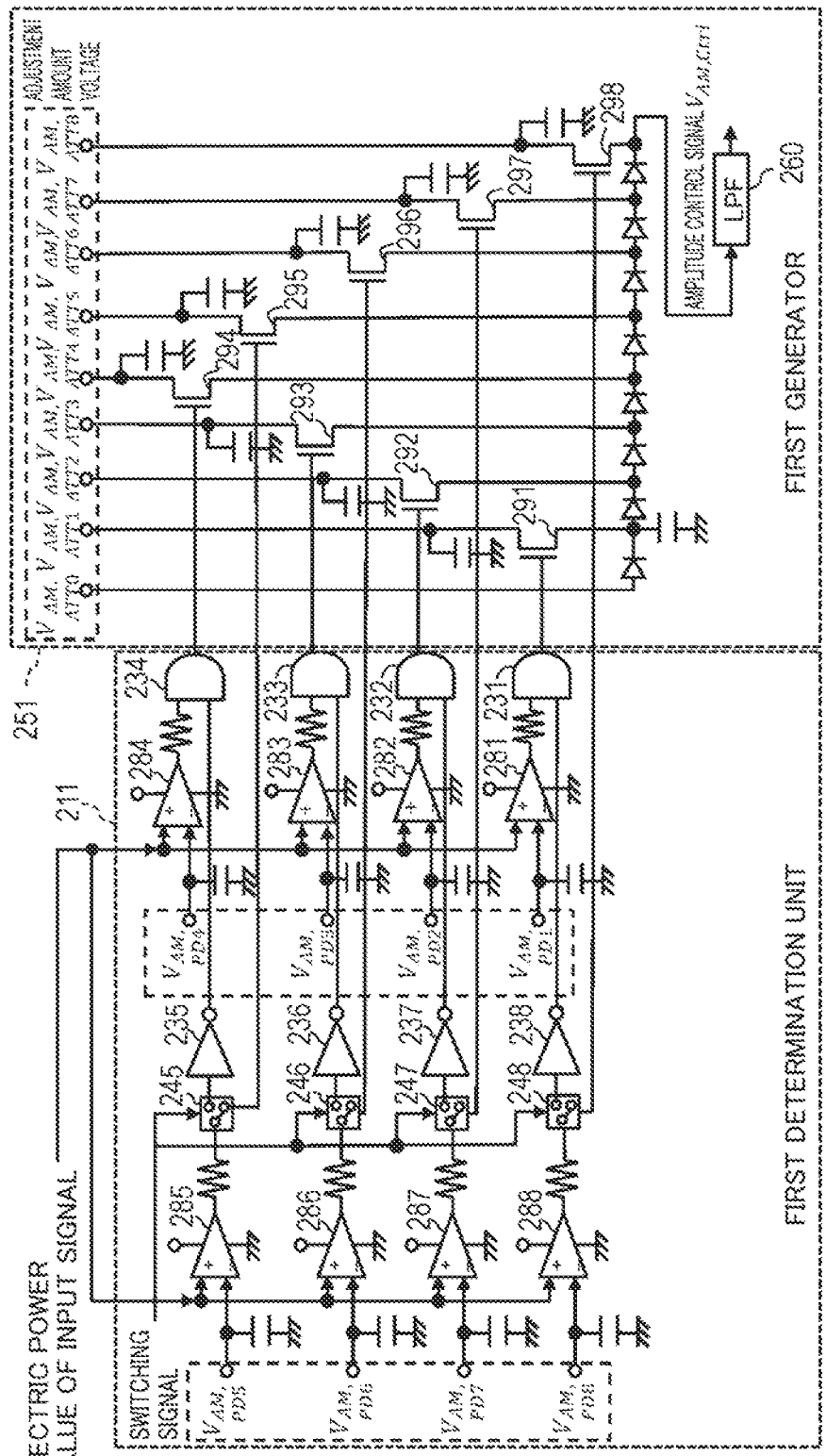
FIG. 11 is a circuit diagram of the controller.

FIG. 11 shows a circuit configured to switch between a first mode for a first amplifier with the first characteristic and a second mode for a second amplifier with the second characteristic. Though the example in FIG. 11 relates to the gain, this is applicable also to the phase. The circuit in FIG. 11 is the same as the circuit in FIG. 10 except for mode switches 245, 246, 247, and 248 added thereto. In FIG. 11, adjustment amount voltages $V_{AM,ATT5}$, $V_{AM,ATT6}$, $V_{AM,ATT7}$, and $V_{AM,ATT8}$ are added, and with addition, switches 295, 296, 297, and 298 for adjustment amount voltages $V_{AM,ATT5}$, $V_{AM,ATT6}$, $V_{AM,ATT7}$, and $V_{AM,ATT8}$ are added. In FIG. 11, relation of $V_{AM,PD1} < V_{AM,PD2} < V_{AM,PD3} < V_{AM,PD4} < V_{AM,PD5} < V_{AM,PD6} < V_{AM,PD7} < V_{AM,PD8}$ is satisfied. In addition, relation of $V_{AM,ATT1} < V_{AM,ATT2} < V_{AM,ATT3} < V_{AM,ATT4} < V_{AM,ATT5} < V_{AM,ATT6} < V_{AM,ATT7} < V_{AM,ATT8}$ is satisfied.

When mode switches 245, 246, 247, and 248 are set to the first mode, outputs from comparators 285, 286, 287, and 288 are directly provided to gates of switches 295, 296, 297, and 298 (a state shown in FIG. 11). When mode switches 245, 246, 247, and 248 are set to the second mode, an output from comparators 285 is provided to an input of NOT gate 235. Therefore, the circuit in FIG. 11 operates as in FIG. 10. Mode switch 245 is switched in response to a switching signal. The switching signal is provided from the outside of distortion compensation circuit 12. The switching signal is provided, for example, from baseband circuit 11. Which of the first mode and the second mode is to be set is selected based on whether amplifier 13 has the first characteristic (characteristic exhibiting monotonous variation) or the second characteristic (characteristic exhibiting an extreme value).

Figure 12:
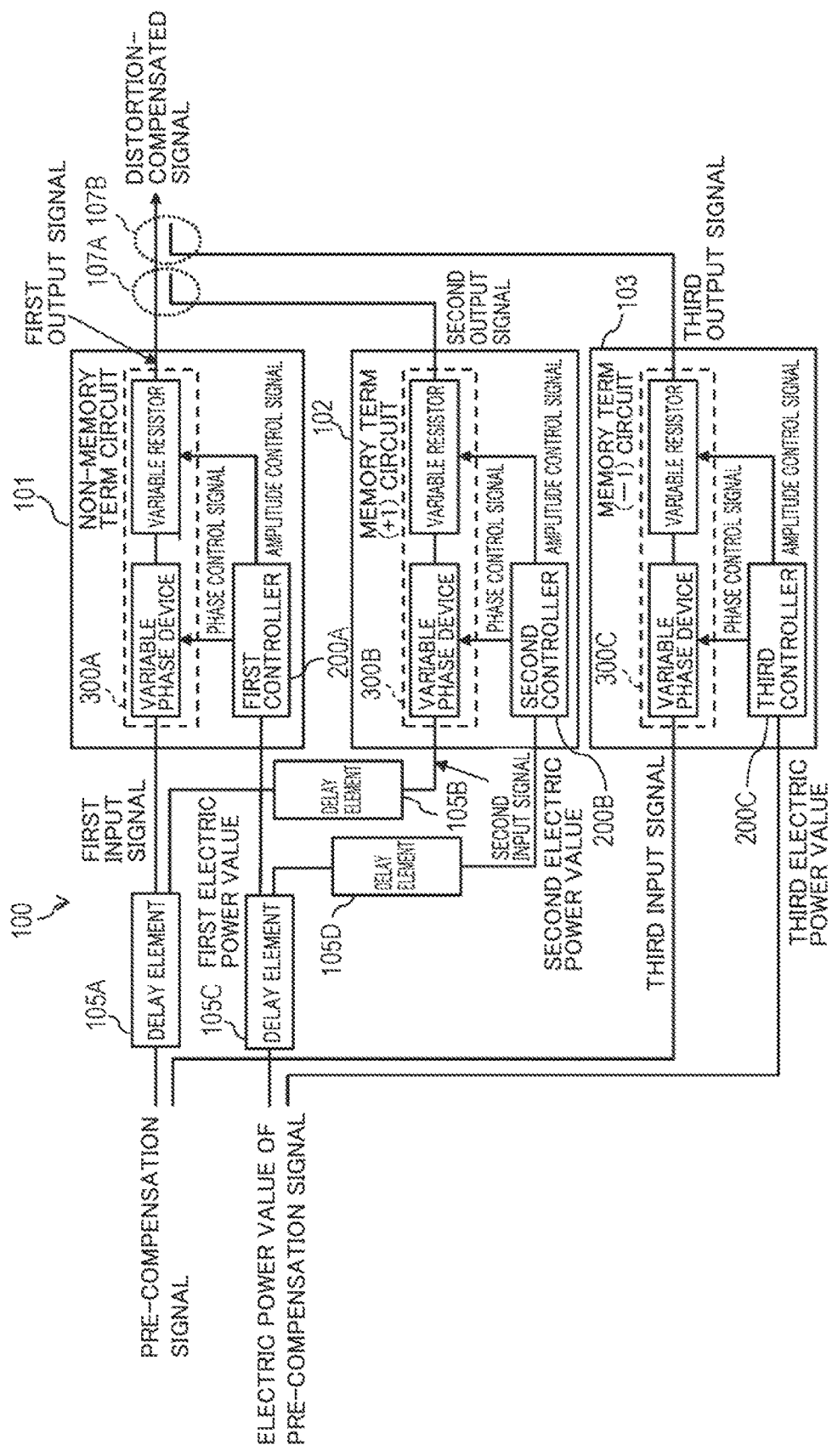
FIG. 12 is a diagram showing a configuration of the distortion compensation device.

FIG. 12 is a modification of distortion compensation device 100 described previously so as to compensate also for a memory effect of amplifier 13. Distortion compensation device 100 shown in FIG. 12 includes a non-memory term circuit 101, a memory term (+) circuit 102, and a memory term (−) circuit 103. Memory term (+) circuit 102 and memory term (−) circuit 103 are configured similarly to non-memory term circuit 101. Distortion compensation device 100 shown in FIG. 12 includes delay elements 105A, 105B, 105C, and 105D. Distortion compensation device 100 shown in FIG. 3 corresponds to non-memory term circuit 101 shown in FIG. 12. Specifically, distortion compensation device 100 shown in FIG. 3 corresponds to distortion compensation device 100 shown in FIG. 12 from which memory term (+) circuit 102, memory term (−) circuit 103, and delay elements 105A, 105B, 105C, and 105D are removed.

A first input signal resulting from delay of a pre-compensation signal by delay element 105A is provided to non-memory term circuit 101. The first input signal corresponds to the input signal in distortion compensation device 100 in FIG. 3. Non-memory term circuit 101 adjusts the amplitude and the phase of the first input signal and provides a first output signal. Non-memory term circuit 101 includes a first adjuster 300A including a variable resistor and a variable phase device. First adjuster 300A is controlled by a first controller 200A. A first electric power value resulting from delay of an electric power value of the pre-compensation signal by delay element 105C is provided to first controller 200A. First controller 200A generates an amplitude control signal and a phase control signal based on the first electric power value.

A second input signal resulting from delay of the first input signal by delay element 105B is provided to memory term (+1) circuit 102. Memory term (+1) circuit 102 adjusts the amplitude and the phase of the second input signal and provides a second output signal. Memory term (+1) circuit 102 includes a second adjuster 300B including a variable resistor and a variable phase device. Second adjuster 300B is controlled by a second controller 200B. A second electric power value resulting from delay of the first electric power value by delay element 105D is provided to second controller 200B. Second controller 200B generates an amplitude control signal and a phase control signal based on the second electric power value.

The pre-compensation signal is provided as a third input signal to memory term (−1) circuit 103. Memory term (−1) circuit 103 adjusts the amplitude and the phase of the third input signal and provides a third output signal. Memory term (−1) circuit 103 includes a third adjuster 300C including a variable resistor and a variable phase device. Third adjuster 300C is controlled by a third controller 200C. The electric power value of the pre-compensation signal is provided as a third electric power value to third controller 200C. Third controller 200C generates an amplitude control signal and a phase control signal based on the third electric power value.

The first output signal, the second output signal, and the third output signal are synthesized by synthesis units 107A and 107B to be a distortion-compensated signal.

Figure 13:
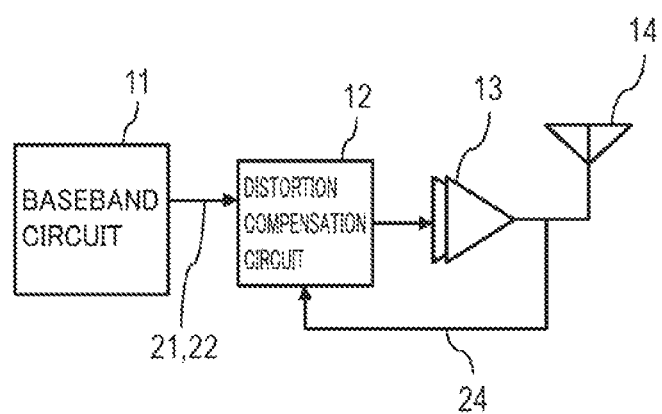
FIGS. 13 to 15 are diagrams showing a configuration of a modification of the communication device.
Figure 14:
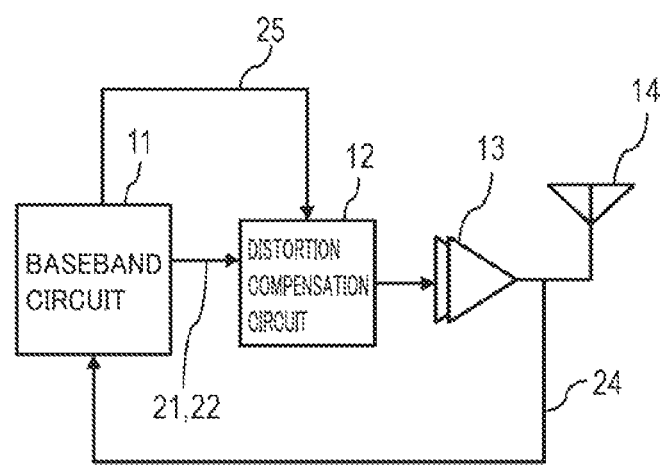
Figure 15:
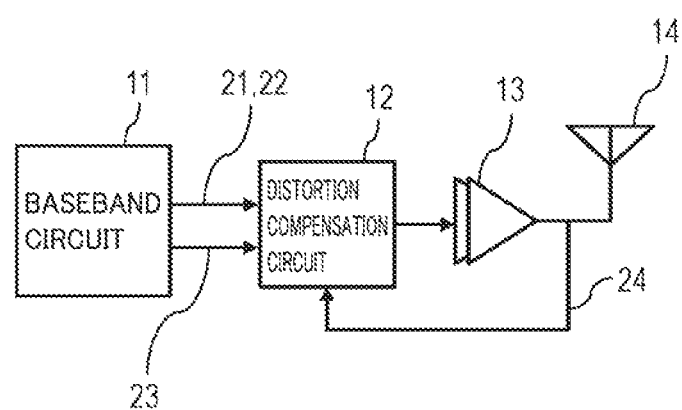

FIGS. 13 to 15 show a modification of communication device 10 shown in FIG. 1. In communication device 10 shown in FIG. 13, though a baseband signal is provided from baseband circuit 11 to distortion compensation circuit 12, an electric power value and reference value $V_{PD}^*$ are not provided. A training monitor signal is provided to distortion compensation circuit 12 rather than to baseband circuit 11. Distortion compensation circuit 12 shown in FIG. 13 itself determines reference value $V_{PD}^*$ based on the training monitor signal obtained through training monitor path 24. Since distortion compensation circuit 12 shown in FIG. 13 does not obtain an electric power value of an input signal from the outside, it includes a detector that detects an input signal. The electric power value is obtained by the detector contained in distortion compensation circuit 12.

In communication device 10 shown in FIG. 14, though a baseband signal is provided from baseband circuit 11 to distortion compensation circuit 12, an electric power value is not provided. Distortion compensation circuit 12 shown in FIG. 14 obtains reference value $V_{PD}^*$ from baseband circuit 11 similarly to the distortion compensation circuit shown in FIG. 1. Therefore, communication device 10 shown in FIG. 14 is provided with training monitor path 24 that extends from an output of amplifier 13 to baseband circuit 11 and reference value path 25 that extends from baseband circuit 11 to distortion compensation circuit 12. Since distortion compensation circuit 12 shown in FIG. 14 does not obtain an electric power value of an input signal from the outside, it includes a detector that detects an input signal.

In communication device 10 shown in FIG. 15, distortion compensation circuit 12 shown in FIG. 15 itself determines reference value $V_{PD}^*$ based on the training monitor signal obtained through training monitor path 24. FIG. 15 is otherwise similar to FIG. 1.

It should be understood that the embodiment disclosed herein is illustrative and non-restrictive in every respect. The scope of the present invention is defined by the terms of the claims rather than the meaning above and is intended to include any modifications within the scope and meaning equivalent to the terms of the claims.

What is claimed is:

1. A controller for an adjuster that adjusts an input signal for pre-distortion of an amplifier, the controller comprising:
    a determination unit that determines a target section corresponding to electric power of the input signal from among set sections; and
    a generator that generates a control signal, wherein
    the adjuster is configured to adjust at least one of an amplitude and a phase of the input signal,
    an amount of adjustment of at least one of the amplitude and the phase of the input signal is brought in correspondence with each of the sections, and
    the generator generates a signal indicating the amount of adjustment brought in correspondence with the target section as the control signal and provides the control signal to the adjuster.

2. The controller according to claim 1, wherein
    the sections are not identical in length.

3. The controller according to claim 1, wherein
    the determination unit includes a comparator provided in correspondence with each of reference values that delimit the sections,
    the comparator provided in correspondence with each of the reference values is configured to compare the reference value with electric power of the input signal, and
    the generator determines the amount of adjustment brought in correspondence with the target section based on a result of comparison by the comparator.

4. The controller according to claim 1, wherein
    the determination unit is configured to switch between a first mode for a first amplifier having a first characteristic and a second mode for a second amplifier having a second characteristic different from the first characteristic,
    in the first mode, the sections are set in accordance with the first characteristic, and
    in the second mode, the sections are set in accordance with the second characteristic.

5. The controller according to claim 4, wherein
    the first characteristic is such a characteristic that variation in gain or phase with respect to electric power of the input signal is monotonous, and
    the second characteristic is such a characteristic that variation in gain or phase with respect to electric power of the input signal has an extreme value.

6. The controller according to claim 1, wherein
    the adjuster includes
        a first adjuster that receives a first input signal and adjusts at least one of an amplitude and a phase of the first input signal, and
        a second adjuster that receives a second input signal delayed or advanced as compared with the first input signal and adjusts at least one of an amplitude and a phase of the second input signal,
    the controller includes a first controller and a second controller,
    each of the first controller and the second controller includes the determination unit and the generator,
    the determination unit of the first controller determines from among set sections, a target section corresponding to electric power of the first input signal as the input signal, and
    the determination unit of the second controller determines from among the set sections, a target section corresponding to electric power of the second input signal as the input signal.

7. The controller according to claim 1, wherein the sections are adjustable.

8. The controller according to claim 1, wherein the input signal is a wireless signal, and the controller is configured to obtain an electric power value of the input signal from outside of the controller.

9. The controller according to claim 1, wherein a difference between a maximum value and a minimum value of reference values that delimit the sections is not larger than 50 dB.

10. The controller according to claim 1, wherein the determination unit includes
   a first determination unit that determines a first target section corresponding to electric power of the input signal from among first sections set for adjustment of the amplitude, and
   a second determination unit that determines a second target section corresponding to electric power of the input signal from among second sections set for adjustment of the phase,
an amount of amplitude adjustment of the input signal is brought in correspondence with each of the first sections,
an amount of phase adjustment of the input signal is brought in correspondence with each of the second sections, and
the generator includes
   a first generator that generates an amplitude control signal indicating the amount of amplitude adjustment brought in correspondence with the first target section as the control signal, and
   a second generator that generates a phase control signal indicating the amount of phase adjustment brought in correspondence with the second target section as the control signal.

11. A distortion compensation device comprising:
an adjuster including a first adjustment unit that adjusts at least one of an amplitude and a phase of an input signal; and
a controller, wherein
the controller includes
   a determination unit that determines a target section corresponding to electric power of the input signal from among set sections, and
   a generator that generates a control signal,
an amount of adjustment of at least one of the amplitude and the phase of the input signal is brought in correspondence with each of the sections, and
the generator generates a signal indicating the amount of adjustment brought in correspondence with the target section as the control signal and provides the control signal to the first adjustment unit.

12. A communication device comprising:
an amplifier; and
a distortion compensation device that compensates for distortion of the amplifier, wherein
the distortion compensation device includes
   an adjuster that adjusts at least one of an amplitude and a phase of an input signal, and
   a controller,
the controller includes
   a determination unit that determines a target section corresponding to electric power of the input signal from among set sections, and
   a generator that generates a control signal,
an amount of adjustment of at least one of the amplitude and the phase of the input signal is brought in correspondence with each of the sections, and
the generator generates a signal indicating the amount of adjustment brought in correspondence with the target section as the control signal and provides the control signal to the adjuster.

13. A method of adjusting an input signal for distortion compensation of an amplifier, the method comprising:
determining a target section corresponding to electric power of the input signal from among set sections; and
generating a control signal for adjusting at least one of an amplitude and a phase of the input signal, wherein
an amount of adjustment of at least one of the amplitude and the phase of the input signal is brought in correspondence with each of the sections, and
the control signal is generated as a signal indicating the amount of adjustment brought in correspondence with the target section.

* * * * *